US007058614B1

(12) United States Patent
Wesseling et al.

(10) Patent No.: US 7,058,614 B1
(45) **Date of Patent: *Jun. 6, 2006**

(54) METHOD AND DEVICES FOR PRINTING A FRANKING MARK ON A DOCUMENT

(75) Inventors: Hennie Wesseling, Leidschendam (NL); Dick Brandt, Leidschendam (NL); Anthonius Johannes Franciscus Van Haldern, Zoetermeer (NL); Rob Pieterse, Aerdenhout (NL); Niels Alexander Van Golden, Gouda (NL); Johannes Francis Gerlofs, Uithoorn (NL)

(73) Assignee: PTT Post Holdings B.V., AK Den Haag (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/856,313

(22) PCT Filed: Nov. 19, 1999

(86) PCT No.: PCT/EP99/09090

§ 371 (c)(1), (2), (4) Date: Aug. 17, 2001

(87) PCT Pub. No.: WO00/31692

PCT Pub. Date: Jun. 2, 2000

(30) Foreign Application Priority Data

Nov. 20, 1998 (NL) .................................... 1010616
Feb. 10, 1999 (NL) .................................... 1011270

(51) Int. Cl.
*G06F 17/00* (2006.01)
*G06F 17/60* (2006.01)
*G06F 12/16* (2006.01)
*B65B 35/00* (2006.01)
*G06K 9/00* (2006.01)

(52) U.S. Cl. ........................ 705/408; 705/60; 705/405; 705/406; 382/101

(58) Field of Classification Search .................. 705/60, 705/62, 63, 401, 406, 407, 408, FOR. 101, 705/405; 382/101
See application file for complete search history.

(56) References Cited

U.S. PATENT DOCUMENTS 4,649,266 A * 3/1987 Eckert ........................ 235/432
5,390,251 A * 2/1995 Pastor et al. .................. 705/62
5,666,284 A 9/1997 Kara
5,671,146 A 9/1997 Windel et al.
5,688,056 A * 11/1997 Peyret ......................... 400/61

(Continued)

FOREIGN PATENT DOCUMENTS

EP 0 331 352 9/1989
EP 0 689 150 A2 * 12/1995
EP 0 854 444 A2 * 7/1998

*Primary Examiner*—Firmin Backer
*Assistant Examiner*—Charlie C. L. Agwumezie
(74) *Attorney, Agent, or Firm*—Young & Thompson

(57) ABSTRACT

A method and system for checking a franking mark (28), comprising at least an identification code and a unique bit string, said system comprising means for: a) reading the franking mark (28), b) decoding the franking mark (28), c) checking whether the identification code is correct by comparing it to data stored in a memory (40), d) checking whether the unique bit string is valid by comparing it to data stored in said memory (40).

20 Claims, 15 Drawing Sheets

U.S. PATENT DOCUMENTS 5,838,812 A 11/1998 Pare, Jr. et al.
5,953,426 A * 9/1999 Windel et al. ................ 380/51
5,978,781 A * 11/1999 Sansone ..................... 705/408
5,982,896 A * 11/1999 Cordery et al. ............... 705/62
6,308,165 B1 * 10/2001 Gilham ........................ 705/62
6,851,619 B1 * 2/2005 Wesseling et al. .......... 235/494

* cited by examiner

ISSUE OF ELECTRONIC STAMP

ISSUE OF ELECTRONIC STAMP WITH COUNTER

PRINTING OF ELECTRONIC STAMP

PRINTING WITH COUNTER

STORING ELECTRONIC STAMP IN PC EMBODIMENT

PRINTING VIA PC EMBODIMENT

METHOD AND DEVICES FOR PRINTING A FRANKING MARK ON A DOCUMENT

BACKGROUND OF THE INVENTION

The present invention is related to a method for checking a franking mark, that at least comprises an identification code and a unique bit string.

"Franking mark" here refers, for example, to an electronic postage stamp, that is to say a mark printed on a postal article by a franking machine or a printer, which inter alia can represent a franking value for said postal article. In the context of the present invention, however, "franking mark" has a wide meaning. The concept "franking mark" can refer to all kinds of marks which can be placed on arbitrary documents for securing said documents. Besides postal articles, such documents can also be value documents, such as admission tickets, payment slips, etc., which are protected by such a mark.

Besides the details of the checking process, the substance of the present invention is also described in the Netherlands patent application 1010616, of which the priority is claimed.

The use of electronic postage stamps is, for example, known from the following two documents publically disclosed by the Engineering Center for the United States Postal Service (USPS): "Information Based Indicia Program (IBIP), Open System Indicium Specification" and "Information Based Indicia Program (IBIP), Open System Postal Security Device (PSD) Specification", both dated 23 Jul. 1997 (draft documents).

With such a method, electronic postage stamps can be obtained and printed on postal articles. The device, for example a computer, with which the electronic postage stamp is printed is thereto provided with a Postal Security Device (PSD), to which a unique identification code is related. The electronic postage stamp comprises various elements, of which a few are mentioned as "security critical": the identification code of the PSD, the value of the contents of an incremental register, the franking value of the postal article and a digital signature. The contents of the incremental register represent the total monetary value of all hitherto printed electronic postage stamps with the related PSD. The combination of identification code and the contents of the incremental register represents a unique bit string per postal article. Since the manner in which said unique bit string is composed must comply with a known rule, the value of a following unique bit string for a following electronic postage stamp can be predicted, which is disadvantageous in regard to possible fraud.

In an article by J. Quittner in FOX Market Wire of 9 Apr. 1998, "Neither bugs, nor hackers, nor Pitney Bows will keep E-stamp from delivering your postage", available on the Internet on 5 May 1998, such a system, which meets these specifications and originates from the firm of E-Stamp, is described. The system of E-Stamp also makes use of a personal computer for printing a franking mark on a postal article directly with the aid of a regular printer connected to said personal computer. The personal computer is connected, via the Internet, with the United States Postal Service. Via the Internet, "electronic postage stamps" can thus be bought at the United States Postal Service. The franking value of the electronic postage stamp is debited directly from the savings balance of the related client and stored and protected in the PSD. The PSD is a small box which can be inserted at the rear of a regular laser printer. As soon as a user has issued a command to print an electronic postage stamp on a postal article, an electronic postage stamp is downloaded and the printer prints a two-dimensional bar code, after which the value of the printed "postage stamp" is debited from the total franking value in the postal security device.

In the system of E-Stamp, the electronic postage stamp according to the publication of J. Quittner comprises in any case an identification code of the user, an identification code of the postal security device, the franking value, the delivery type (for example express delivery), the sender's address and the date. Further, the electronic postage stamp can also contain data related to the sending company and room is provided for possible advertisements.

SUMMARY OF THE INVENTION

The object of the present invention is to provide a method and a system which can check such electronic postage stamps.

The method according to the invention therefore comprises the following steps:

a. reading the franking mark,
b. decoding the franking mark,
c. checking whether the identification code is correct by comparing it with data stored in a memory,
d. checking whether the unique bit string is valid by comparing it with data stored in a memory.

The system for checking a franking mark, which at least comprises an identification code and a unique bit string, further comprises means for:

a. reading the franking mark,
b. decoding the franking mark,
c. checking whether the identification code is correct by comparing it with data stored in a memory,
d. checking whether the unique bit string is valid by comparing it with data stored in a memory.

BRIEF DESCRIPTION OF THE DRAWINGS

The present invention will be explained below with reference to some drawings intended only as an illustration of the invention and not as a limitation thereof. In particular, the invention has broader application than postal traffic only.

DESCRIPTION OF THE PREFERRED EMBODIMENTS

Figure 1:
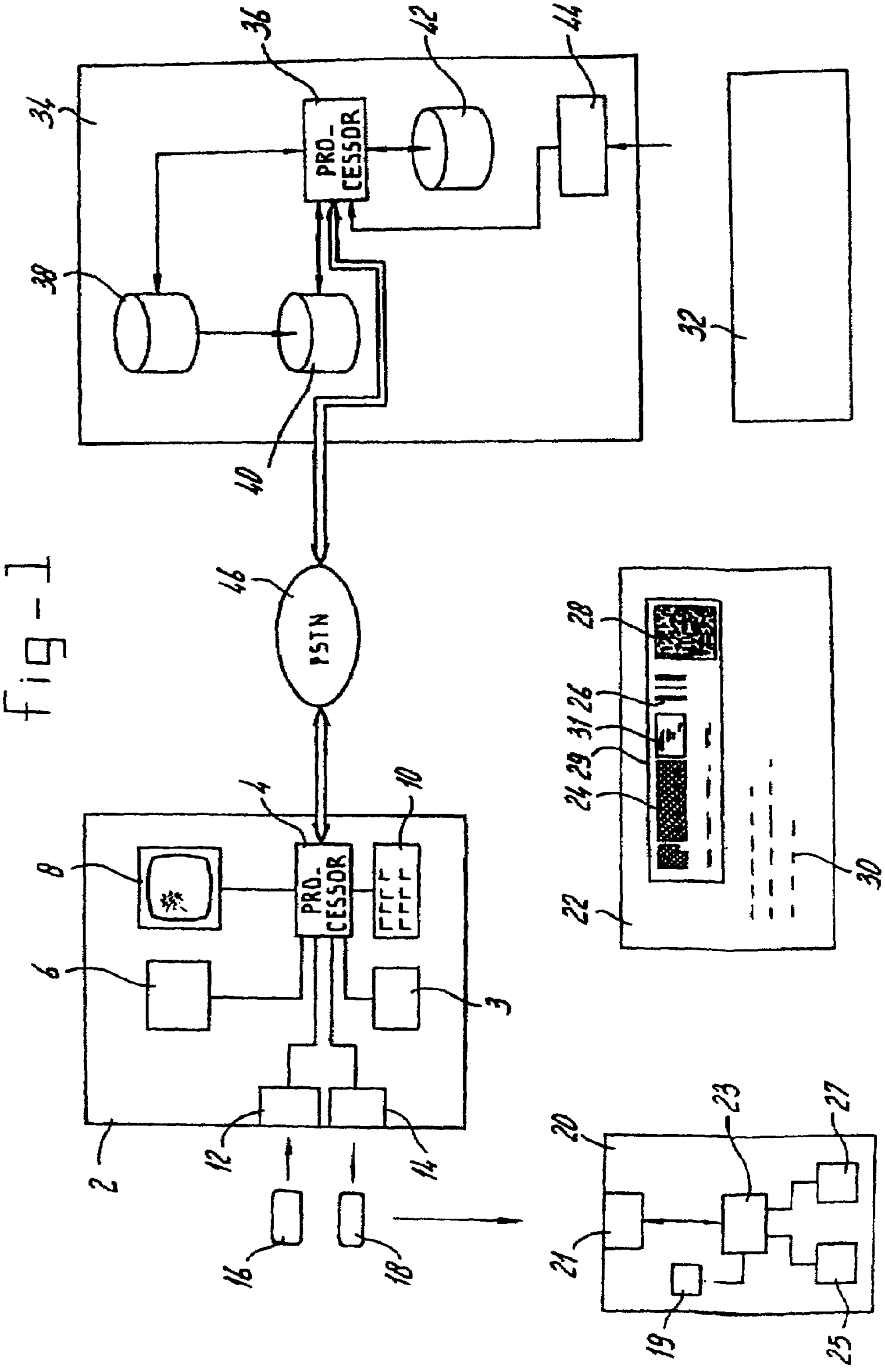
FIG. 1 shows an embodiment of a system according to the invention, in which use is made of an information carrier in which one or more electronic postage stamps can be stored.

In FIG. 1, reference number 2 refers to a terminal, which, for example, is set up in the wall of a post office. Said terminal 2 can communicate with an exchange 34, for example via the public switched telephone network (PSTN) 46. Communication paths via other networks are of course possible. In this case, use can be made of the Internet. Communication can also take place in other ways, for example via CDROMs, floppy disks, etc.

The terminal 2 shown in FIG. 1 comprises a processor 4, which is coupled to display means 8 for communicating with a user. Said terminal 2 also comprises a memory 6, which is connected to said processor 4. Reference number 10 diagrammatically refers to a keyboard, with which a user can input data and instructions for said processor 4. To this end, said keyboard 10 is connected to said processor 4. Said processor 4 is further connected to a Secure Access/Application Module 3 (usually called "SAM"). The SAM3 is shown in FIG. 1 within terminal 2. If so wished, SAM3 may also be present outside terminal 2. If desired, SAM3 may even be mounted near or in exchange 34.

In the embodiment shown in FIG. 1, said terminal 2 is provided with two input/output units 12, 14. In said input/output unit 12, a bank card or ATM card can be inserted. The input/output unit 12 is thereto provided with one or more suitable connectors (not shown) which can be brought into contact with the bank card and/or ATM card 16, as persons skilled in the art will know. With such a bank card and/or ATM card, the user can identify himself and effect a PIN payment. In the event that said bank/ATM card contains an electronic purse, the user can herewith also effect payment actions, for example the payment of an electronic postage stamp which is to be printed on a postal article.

Said input/output unit 14 is arranged for accepting an information carrier 18, which can be a chip card. To this end, said input/output means 14 are provided with one or more suitable connectors which can come into contact with the processor (not shown) on said chip card 18, as persons skilled in the art will know. On such an information carrier 18, one or more electronic postage stamps, in an embodiment of the invention, are stored. Such postage stamps are then preferably stored under protection of a message authentication code (MAC) and/or protection by encoding.

In an embodiment, the ATM card/bank card is a multi-functional chip card, which inter alia can be used for payment purposes, but also offers possibilities for other applications. An example of such a chip card is the Chipper® of the Netherlands KPN Telecom and Postbank. In that case, said cards 16 and 18 can be the same card and said input/output means 12 can be omitted.

Alternatively, said information carrier 18 can also be a card with, for example, a magnetic strip which itself is not provided with processor means. Data can then be written to, read from and deleted from the magnetic strip by said terminal 2. In that case, electronic postage stamps can be stored under protection by encoding. It is imaginable that said terminal 2 has a supply of such magnetic strip cards and that a customer buys one or more of such cards. On the magnetic strip, one or more of such electronic postage stamps can then be stored. Such magnetic strip cards can be disposable cards. Optionally, chip cards can also be used as disposable cards.

In FIG. 1, the reference number 20 refers to a franking machine. Said franking machine 20 is provided with input/output means 21 for accepting said information carrier 18. Said franking machine 20 is also provided with a processor 23, which, besides being connected to said input/output means 21, is also connected to weighing means 25, a printer 27 and a SAM 19.

Via said input/output means 21, said processor 23 can communicate with the information carrier 18.

With the aid of the weighing means 25, the franking machine 20 can determine the weight of a postal article 22.

With the aid of said printer 27, the franking machine 20 can subsequently print information 29 on the postal article 22.

Said information 29 comprises, for example, human-readable data 24 related to the mail-sending organisation (or other advertising), as well as a marking sign 26 (for example a bar code) enabling automatic orientation of the postal article in a stamping/sorting machine, and a franking mark 28, for example in the form of a two-dimensional bar code 28, which contains further, possibly encoded, information. Said franking mark 28 shall at least contain a unique bit string, the use of which will be explained further on, and an identification code. The identification code identifies the user, i.e. the person who purchased the electronic postage stamp, and/or the device with which the franking mark is printed. If the identification code is coupled to the printing device, this can, for example, be a unique code associated with said SAM 19. In that case, the owner of the franking machine is responsible for possible fraud with the use of electronic postage stamps.

As identification code of the user, the number of said bank card 16 can be used. The bank card number is after all a unique number which is coupled to the user, while a reasonable degree of certainty can be provided that the user is the owner of said bank card 16 by having him identify himself via a PIN code.

Further, said franking mark 28 can comprise information related to the terminal 2 and the franking machine 20, as well as the type of postal delivery (regular, express delivery, registered, per air mail, etc.).

The franking value can also be printed on the postal article 22 in human-readable form 31.

On said postal article 22, space is allocated for the address 30 of the addressee.

The system shown in FIG. 1 comprises a device 32 to read in said postal articles 22 during dispatch from the sender to the addressee. If the unique bit string directly represents a franking value, the franking value, for example, can be checked. The data read in by said device 32 can be supplied to the exchange 34. The information which is read in by said device 32 can be supplied to said exchange 34 in any prior art manner.

For inputting the information to a processor 36 present in said exchange 34, said exchange 34 is provided with suitable input means 44 which are connected to said processor 36.

For implementing the method according to the invention, said exchange 34 is preferably provided with three memories 38, 40, 42. Of course these are not required to be physically separate memories. They can refer to different fields within one larger memory.

Figure 2A:
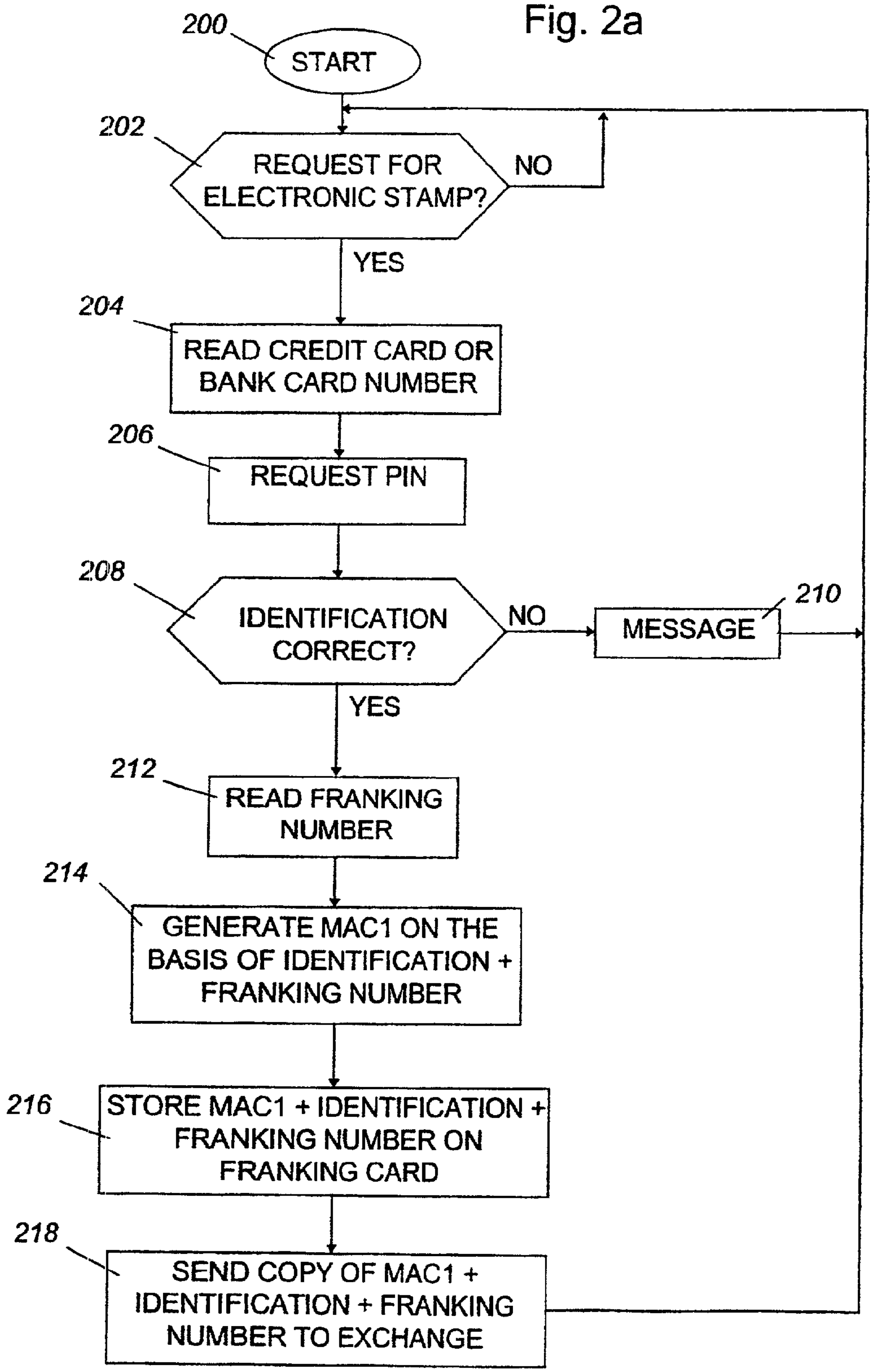
FIG. 2*a* shows the steps of a method for providing an electronic postage stamp.

FIG. 2*a* shows a possible embodiment of the functioning of the terminal 2 during operation.

A customer arrives at said terminal 2 and inserts his bank card 16 (this shall hereinafter be used to refer to both a bank/ATM card or any (multi-functional) chip card) in the corresponding input/output means 12. The processor 4 requests, via the monitor 8, which type of electronic postage stamps the customer wants to have. The customer can, for example, indicate that he wishes to purchase a franking card

18 (this term shall be used hereinafter for every possible type of information carrier 18) with 100 electronic postage stamps of 80 cents. This takes place in step 202.

The processor 4 reads the number of the bank card 16 and asks the user to identify himself with his PIN code, steps 204 and 206.

In step 208, said processor 4 checks, in a manner known per se, whether the customer has identified himself correctly. If not, an error message follows in step 210. After the error message in step 210, said processor 4 can return to the beginning of the flowchart drawn in FIG. 2*a*. Alternatively, a user, as known per se, can be given three opportunities to enter the correct PIN code.

If a user has identified himself in the correct manner, the program in said processor 4 jumps to step 212 and reads a franking number. In accordance with the invention, the franking number consists of a bit string which is unique and is selected from a set of unique bit strings.

The set of unique bit strings is stored in said memory 38 in said exchange 34. Said exchange 34 is connected to several terminals 2 distributed across the country and can, for example via the PSTN 46, make one or more unique franking numbers available from the set of unique franking numbers to said terminals 2. In that event, a certain amount of desired unique franking numbers can be transferred per transaction from the memory 38 in the exchange 34 to the memory 6 in the terminal 2. Alternatively, however, each of the terminals 2 can have stored a certain supply of unique franking numbers in said memory 6 beforehand, so that it is not required to establish a connection between the terminal 2 and the exchange 34 each time a transaction with a customer takes place. Transmission of the unique bit strings can be protected in any prior art manner.

The set of unique franking numbers in the memory 38 of the exchange 34 consists, for example, of bit strings of 128 bits. This set thus contains such a large number of unique franking numbers that the need for such numbers will be covered for years to come.

Preferably prior to step 212, the customer pays the franking card 18 in an electronic manner. This is done with the aid of the bank card 16 in a manner known per se. That is to say that, if said bank card 16 is a regular bank card, payment takes place by debiting the customer's bank balance. The manner in which this is done is known to those skilled in the art and does not require further explanation here. In the case that said bank card 16 comprises an electronic purse, the amount owed can be debited directly from the balance of said bank card 16. Payment can also take place in cash.

The processor 4 then provides, via the input/output means 14, a separate franking card 18 in which both the identification code and the related franking numbers are stored. In an embodiment, said identification code and said franking numbers are stored with a message authentication code MAC1, which is calculated by the SAM 3 of the terminal 2 together with the processor of the bank card 16. As known, a MAC is a checksum of supplied text by means of which it can be checked whether the supplied text is valid. Each modification in the text (in this case the identification code and the franking numbers) can be detected. A MAC can only be cross-calculated with a secret key, which is known only to said SAM 3 and the appropriate postal authorities. The generation of MAC1 and the storage of the required data on the franking card 18 takes place in the steps 214 and 216.

If several franking numbers are made available for use, the calculation of as many MAC1s may cost too much time. Therefore, as desired, the calculation of MAC1 may be limited to a calculation over the identification code and/or other known data such as date of issue, value etc.

As an alternative for the calculation of a MAC, the data can also be stored in encoded form.

For further protection of the whole, the processor 4 preferably sends a copy of the identification code with the issued franking numbers, protected by MAC1 and/or protected by encoding, to the exchange 34, which stores this information in memory 40 so that at a later stage possible fraud can be checked centrally, step 218. This will be further discussed later.

If desired, a terminal code, which uniquely identifies the terminal 2 which issued the franking card 18, can be stored in the memory of the franking card 18. If desired, said terminal code can form part of the calculation which the MAC1 has supplied. The terminal code, namely, can then not be changed unnoticed either.

Figure 3A:
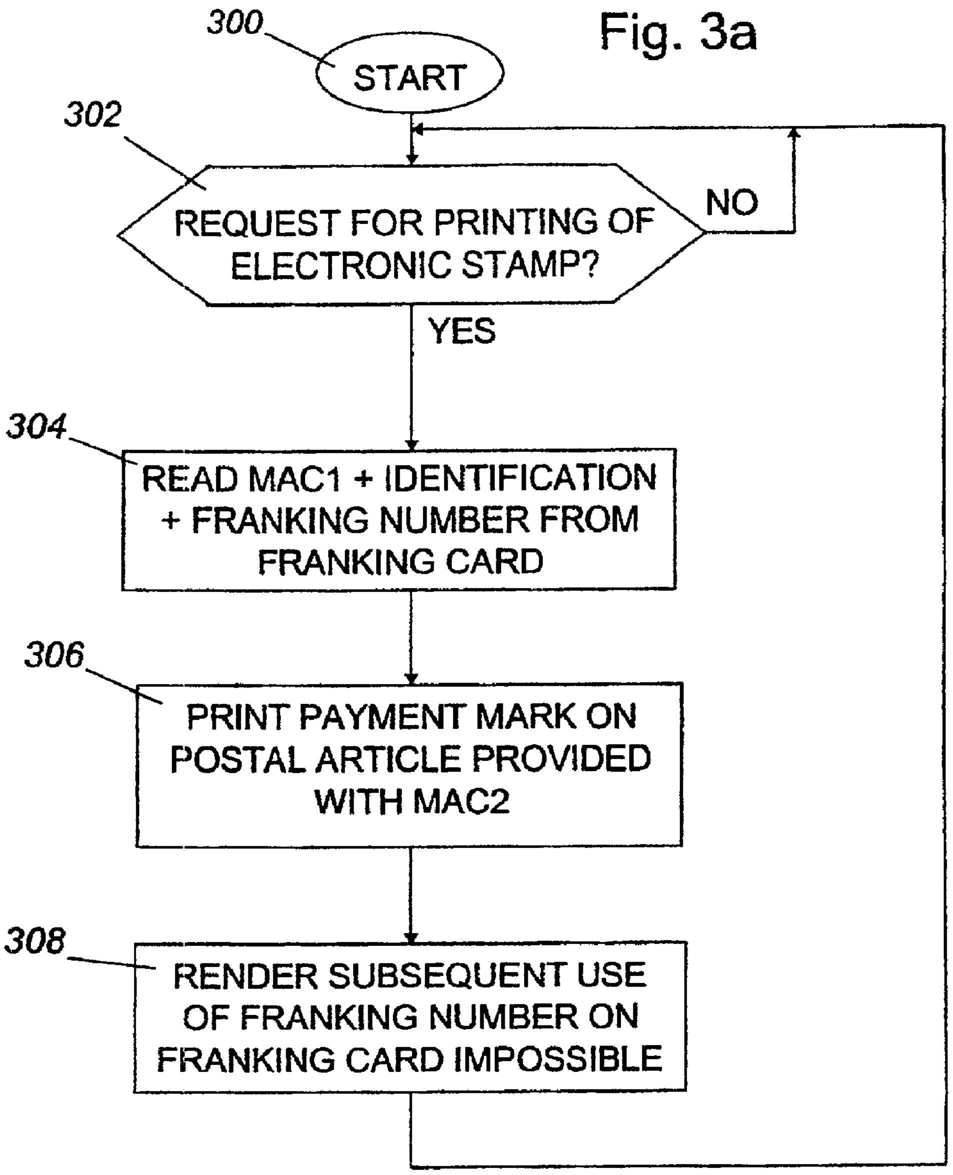
FIG. 3*a* shows the steps for printing an electronic postage stamp.

FIG. 3*a* shows a flowchart of the functioning of franking machine 20 in accordance with the method as explained with reference to FIG. 2*a*.

A user inserts his franking card 18 in the input/output means 21 of the franking machine 20 intended for this purpose. By doing so, contact is established between the franking card 18 and the processor 23 of the franking machine 20. Via suitable input means (for example a keyboard, not shown), the user issues a command to said processor 23 to print an electronic postage stamp on postal article 22. As soon as said processor 23 has established that such an instruction has been received, step 302, said processor 23 reads either MAC1 with the related identification code and franking number, or the identification code and the franking number in encoded form from said franking card 18. If present, the terminal code, which is stored in said franking card 18, will also be read.

On the basis of the read-in data, the franking machine 20 compiles, in a predetermined manner, a franking mark and prints this on the postal article 22, step 306. To this end, said franking machine 20, in a manner known per se, is provided with an opening in which the postal article 22 can be inserted, so that the franking mark can be printed on the postal article 22 with the aid of the printer 27.

The situation can be such, for example, that said processor 23 is able to check whether the franking value is sufficient in view of the weight of said postal article 22. To this end, said postal article 22 is weighed by the weighing means 25, which send a weighing signal to said processor 23. The franking number can, for example, belong to a certain sub-group of all unique franking numbers which are only allowed to be used for postal articles up to and including 50 grams. A separate sub-group of unique franking numbers is then available per weight class and per type of postal delivery. Said processor 23 can thus check directly whether the franking value is correct, and, if this is not the case, warn the user via a display (not shown).

The franking mark, for example, is printed in the form of a two-dimensional bar code 28 on the postal article 22. Preferably the franking mark comprises at least the following data: the related franking number, the identification code of the user, the terminal code of the terminal 2, and a franking machine code which identifies the franking machine 20. Preferably said data, provided with a further MAC (MAC2), are printed in the franking mark. Such a MAC2 is calculated by SAM 19 in the franking machine 20 together with the franking card 18, which thereto must be provided with a processor (not shown). Alternatively, the data can also be printed in encoded form, in which case the encoding takes place with the aid of known cryptographic techniques (possibly including the placing of a digital signature). If desired, SAM19 may keep track of a counter which, from a certain moment in time $t_0$, reflects the total amount spent on franking in the franking machine 20 up to the moment concerned. The content of this counter then also is part of the franking mark.

Optionally, the franking mark 28 can also comprise: address information of addressee and sender (possibly return address), service information such as “registered”, “express delivery”, etc., and date and time. This information can then be provided with a MAC and/or be encoded with the above-mentioned data with the aid of known cryptographic techniques.

After the franking machine 20 has printed the franking mark on the postal article 22, said franking machine 20 can render each following use of the used franking number on the franking card 18 impossible. This takes place in step 308. This may be done, for example, by deleting the related franking number on said franking card 18.

Upon dispatch of the postal article 22 from a sender to a receiver, said postal article 22 will, at a given time, arrive in a sorting centre. There said postal article 22 will be read in with the aid of the means 32, and it can be checked again whether said postal article 22 has been sufficiently franked. The means 32 read at least the franking mark 28. The means 32 thus collect all read-in franking marks 28 of all postal articles which are provided therewith. All franking marks 28 are subsequently sent to the exchange 34 and are there read in by the processor 36 via the input means 44. Said processor 36 stores the inputted franking marks in the memory 42.

At an earlier stage, said processor 36 had already received data from the terminals 2 related either to franking numbers issued with related identification codes and MAC1s, or to encoded franking numbers with related identification codes. Said data were stored in the memory 40 by the processor 36. Thus said processor 36 is able to compare the data received via the input means 44, after storage in the memory 42, with the data stored in said memory 40. Thus it can be checked whether the franking numbers present in said memory 42 were indeed issued. If the franking number, the identification code, the terminal code and/or the franking machine code have been tampered with in any way, said processor 36 can derive this directly from the MAC1 and MAC2 or encoded data included in the franking mark. Said processor 36 can then further derive for which terminal 2 and/or which user irregularities have occurred. The identification code, after all, uniquely identifies the user and/or the SAM 3 in the terminal 2.

A further check takes place by processor 36 maintaining which unique franking numbers were sent to the terminals 2, for example by storing said franking numbers in the memory 40. Of course said franking numbers can also be stored in another memory. In the first place, said franking numbers which were already sent to the terminals 2 can then not be sent again. In the second place, the data sent to the exchange 34 by the terminals 2 can then, in a first round, already be compared to the issued franking numbers, so that it can be checked directly whether the franking numbers issued by the terminals 2 were indeed franking numbers which were sent from the memory 38.

If the franking mark 28 possesses an identification code which uniquely identifies the owner of the bank card 16, it is possible to implement the invention with later payment. After all, from the received franking marks 28 the processor 36 can then unequivocally derive which customers have used which franking numbers. This opens the possibility that the means 32, for example, measure the weight of the postal article 22 and inform said processor 36 of the weight together with the franking mark 28. In that case, said processor 36 establishes at that time how much the customer must pay for sending the related postal article, one and the other being dependent upon, for example, the weight of the postal article 22 and the type of dispatch. The balance of the customer at the bank is then debited for the related amount in a manner known per se. Instead of this, of course, an invoice can be sent or the balance can be debited at another bank, with which, in a manner known per se, a communication link is established. The advantage of this alternative method is that the issuance of franking numbers is not yet coupled to the value which is required in view of the weight and the type of dispatch of said postal article 22. The unique franking number is then only an identification of the postal article 22. The franking number does then not need to comprise information related to the franking value.

In theory, therefore, two types of cards are possible: loadable cards (for example chip cards) and non-loadable cards (for example magnetic strip cards). In theory, three different ways of payment are further possible in both cases: entire pre-payment of each electronic postage stamp, entire post-payment of each electronic postage stamp, and a combination of pre-paid and post-paid electronic postage stamps.

Figure 2B:
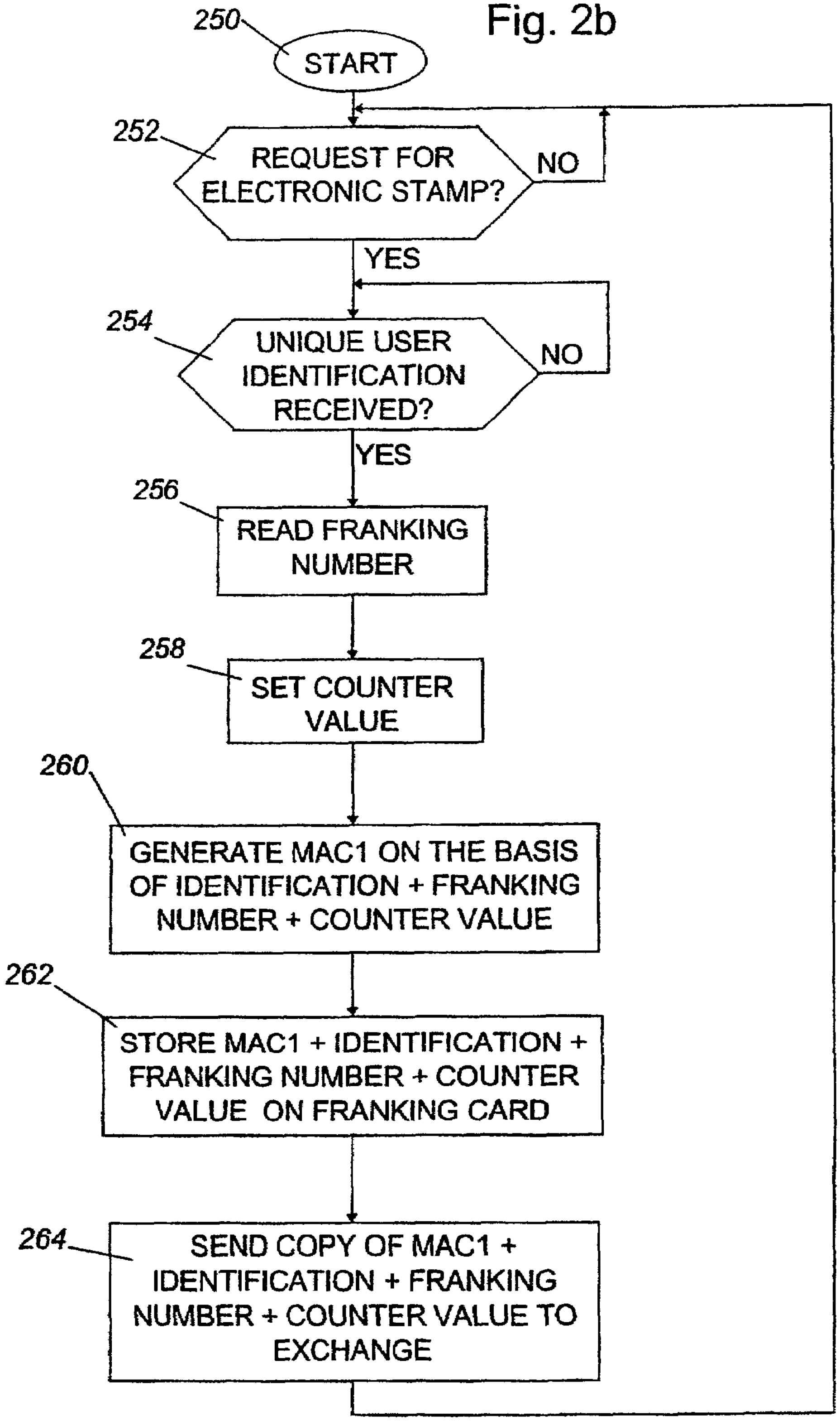
FIG. 2*b* shows the steps of a method for providing the electronic postage stamp, in which use is made of a counter.
Figure 3B:
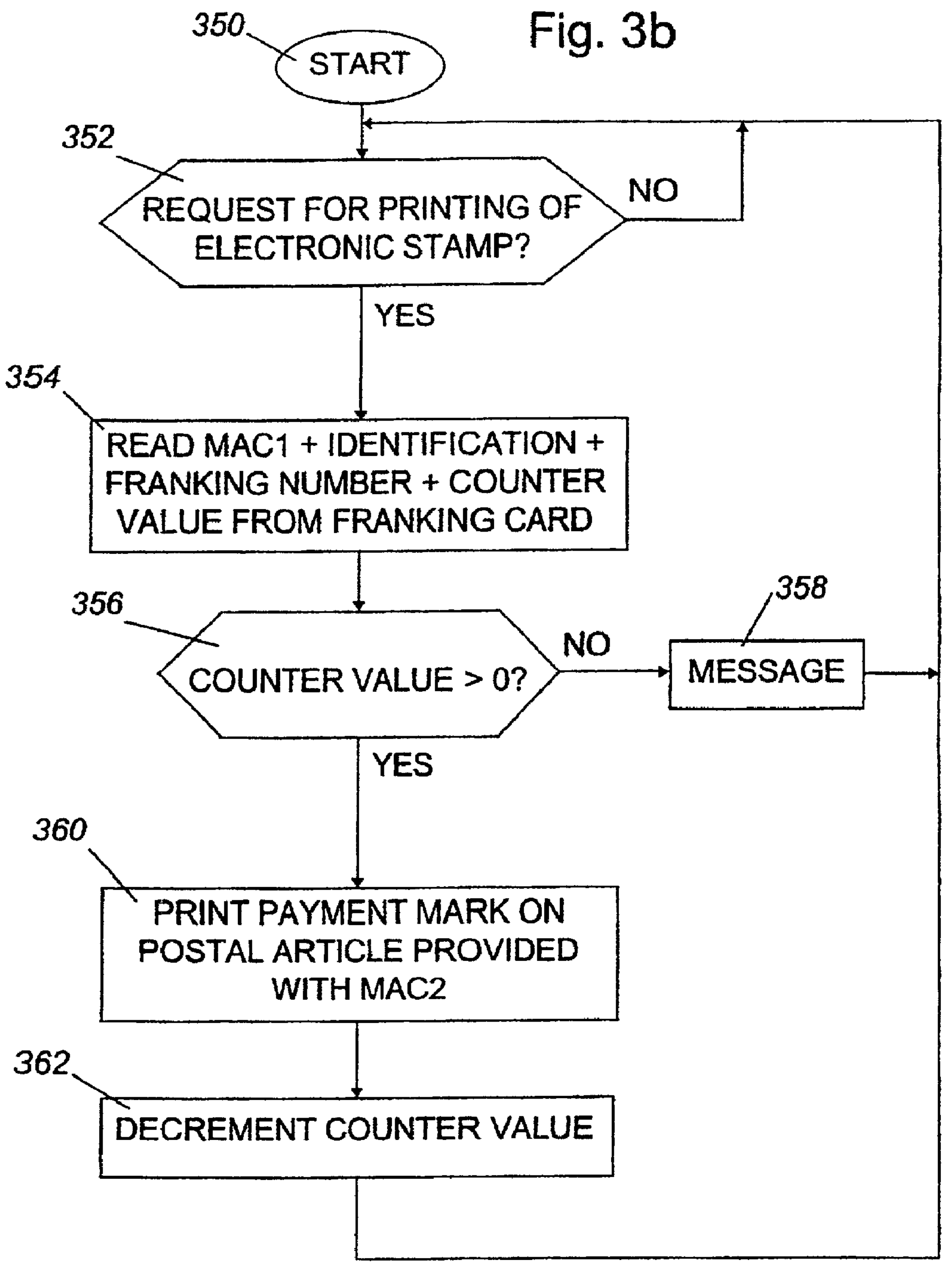
FIG. 3*b* shows the steps for printing an electronic stamp, in which use is made of a counter.

FIGS. 2*b* and 3*b* show flowcharts for an alternative embodiment of the method according to the invention. Said alternative method is related to an embodiment in which a unique franking number is not applied per postal article. In some cases, a customer could wish to frank 1000 or more postal articles, for example. With the means available at this time for storing data on credit cards and/or cards provided with magnetic strips, it is impossible to store such large amounts of unique franking numbers, consisting, for example, of 128 bits. This problem can be circumvented by providing a franking number with a certain counter value.

The method for providing an electronic stamp with counter is explained on the basis of FIG. 2*b*. Step 252 corresponds to step 202 in FIG. 2*a*.

Step 254 shows in an abbreviated way that a user must identify himself, for example in the manner as explained on the basis of steps 204–210 in FIG. 2*a*.

Step 256 corresponds with step 212 in FIG. 2*a*.

After the processor 4 has read the franking number, said processor 4, in step 258, reads a counter value. Said processor 4 can do this, for example, by asking the user via the monitor 8 to supply such a counter value. The magnitude of the counter value then determines the number of times that the related franking number may be used. Alternatively, the counter can represent a monetary value which can be expended on electronic postage stamps. The user can enter the counter value via the keys of the keyboard 10.

In step 260, said processor 4 generates MAC1 on the basis of the identification code of the user, the franking number issued and the counter value. Alternatively, said data can be stored in encoded form. The counter value, therefore, is then securely stored and can not be changed unnoticed.

In step 262, said processor 4 stores either MAC1 with the identification code, the franking number issued and the counter value, or the encoded data, on the franking card 18.

Again, said franking card 18 can have any embodiment such as explained above with reference to FIG. 2*a*.

In step 264, the processor 4 sends a copy of MAC1 with identification code, franking number and counter value, or the encoded form of said data, to the exchange 34. The exchange 34 again stores the data in the memory 40 and thus knows how often the related franking number may be used.

FIG. 3*b* shows a flowchart of the functioning of franking machine 20 for the embodiment in which use is made of a counter.

In step 352, the franking machine 20 waits until the customer has submitted a request for printing an electronic postage stamp. Said step corresponds to step 302 in FIG. 3*a*.

As soon as the customer has submitted this request, the franking machine reads either MAC1 with identification code, franking number and counter value, or said data in encoded form, from the franking card 18. This takes place in step 354.

In step 356, the processor 23 checks whether the read-in counter value is still greater than zero. If this is not the case, the related franking number is not allowed to be used further and an error message follows in step 358. After step 358, the program returns to step 352.

If the counter value is indeed greater than zero, the program of the processor 23 proceeds with step 360. In step 360, said processor 23 controls the printer 27 in such a manner that the franking mark calculated by said processor 23 is printed on the postal article 22. Said franking mark is again preferably provided with MAC2. Alternatively, all data are printed in encoded form in the franking mark.

Thereafter, in step 362, the processor 23 decrements the counter value on the franking card 18 in order to indicate that the related unique franking number may be used once less, or to decrement the available value.

Of course the calculation of MAC2 also takes the modified counter value into account.

The actual counter value then forms part of the franking mark 28 on the postal article 22.

It is remarked that the combination of unique franking number and actual counter value then still entails a unique bit string. This latter bit string, however, then has more bits than the number of bits of the unique franking number.

The current counter value is then jointly read by the means 32, and subsequently also stored in the exchange 34, via the input means 44 with the aid of the processor 36, in the memory 42. Said processor 36 then has the possibility of checking whether each combination of franking number and counter value is indeed used only once. Since the related information is protected by MAC2 or is securely stored by encoding, illicit modification of these numbers can be detected by processor 36.

Said processor 36 can also check whether the customer has used the franking number for the permitted number of times.

It will be clear that the embodiment according to FIGS. 2*b* and 3*b*, just as the embodiment according to FIGS. 2*a* and 3*a*, can be used with pre- and post-payment.

Optionally it is possible, in the embodiment according to FIG. 1, where use is made of the franking card 18, to restrict the use of the franking card 18 to a number of pre-selected franking machines 20. To this end, the franking cards 18 can be provided with those franking machine codes, related to said franking machines 20, on which the use of said franking card 18 is permitted.

A further option is to implement the system shown in FIG. 1 in such a manner that each of the franking cards 18 is also allocated a unique number. Possible fraud with franking cards 18 can then be pin-pointed. Information related to said fraudulently used franking cards 18 can then be included on an arbitrary franking card 18. Subsequently, said information, related to the fraudulently used franking cards 18, can then be transferred "unperceived" to the franking machines 20, which store the related information in a memory (not shown). If a customer with fraudulently used franking card 18 wishes to print an electronic postage stamp, the franking machine 20 can detect the related franking card 18 and render it invalid. This can be done either by deleting the contents of the franking card 18 or making them non-readable, or by simply refusing to print an electronic postage stamp. Thereby further damages by possible fraud can be decreased.

As an alternative for the use of a counter, a franking number, which for example can be used by the customer for a predetermined number of days, can also be used. This is only possible in the embodiment with which post-payment takes place. In that case, the franking number is still unique, but the franking number is used for more than one postal article 22. Since in that case a franking card 18 with a certain unique franking number can be used for a non-predefined number of times, it is preferable in such an embodiment to apply a PIN code which the user of the franking card 18 requires in order to use said franking card 18 on the franking machine 20. In that case, said franking machine 20 must be arranged such that it can check the PIN code associated with said franking card 18.

Figure 5:
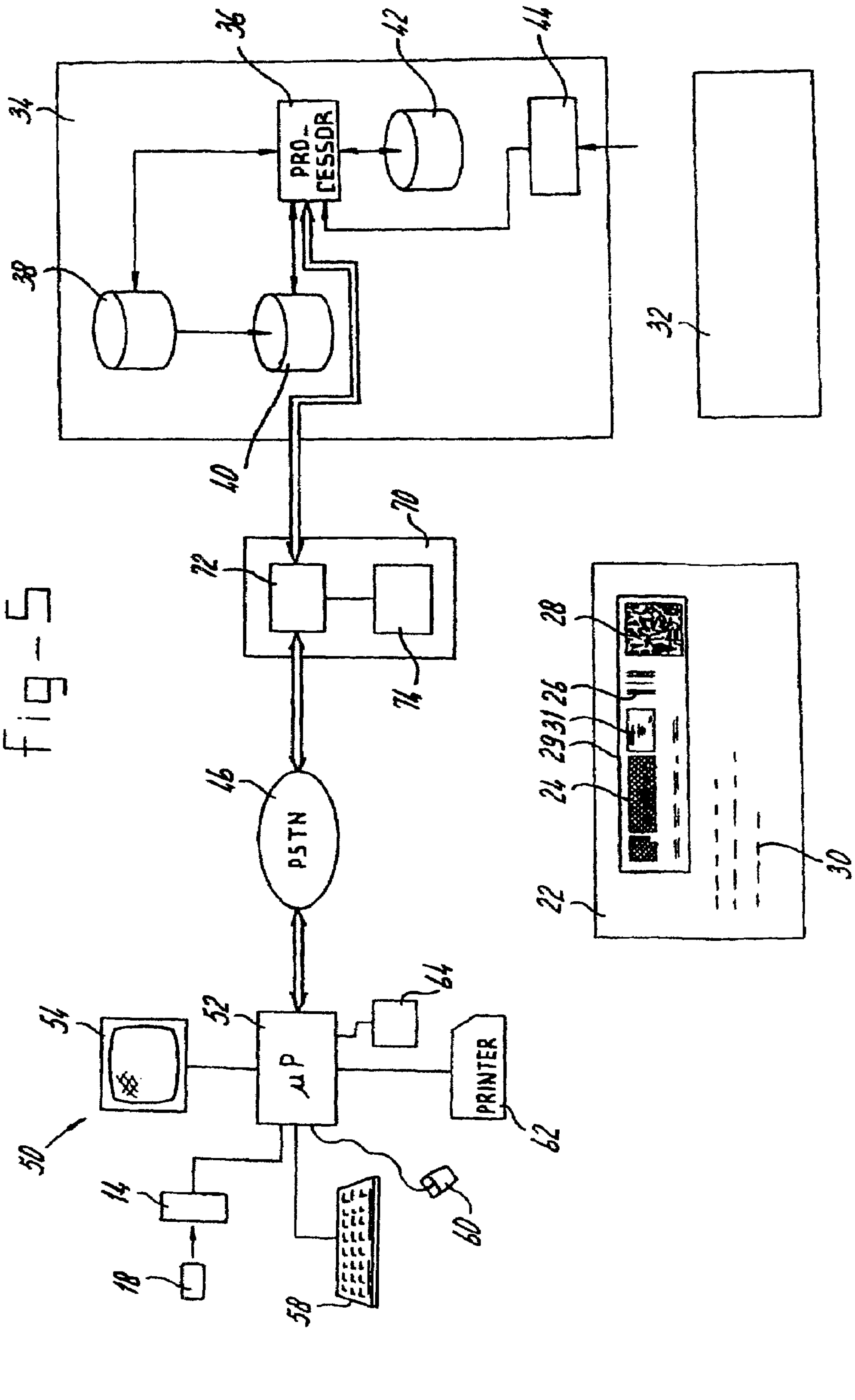
FIG. 5 shows a system according to the invention, in which use is made of a personal computer.

FIG. 5 shows an alternative embodiment of the invention in which use is made of a PC of a user instead of a terminal 2 such as shown in FIG. 1.

Parts which are identical in FIGS. 1 and 5 have the same reference numbers.

In FIG. 5, reference number 52 designates the microprocessor of the PC 50 of a user. The microprocessor 52 is connected to a monitor 54, a printer 62, a keyboard 58 and, if desired, a mouse 60. In one embodiment, the microprocessor is also connected to input/output means 14, which can accept a bank card 18 (multi-functional chipcard). For calculating MACs or for determining the encodings of the data to be printed, the microprocessor 52 can be coupled to a SAM 64.

The microprocessor 52 is connected, for example via the PSTN, to a server system 70 to which several computer systems can be connected. Several server systems can be provided, each with their own connections to PCs. Said server system 70 is connected to the exchange 34. Said server system 70 comprises a server processor 72, to which a SAM or HSM (=Host Security Module=a computer system with the same functionality as a SAM, but with much larger capacity) 74 is connected.

The communication between said PC 50 and the server system 70 can, for example, take place with an Internet protocol (IP).

Figure 4A:
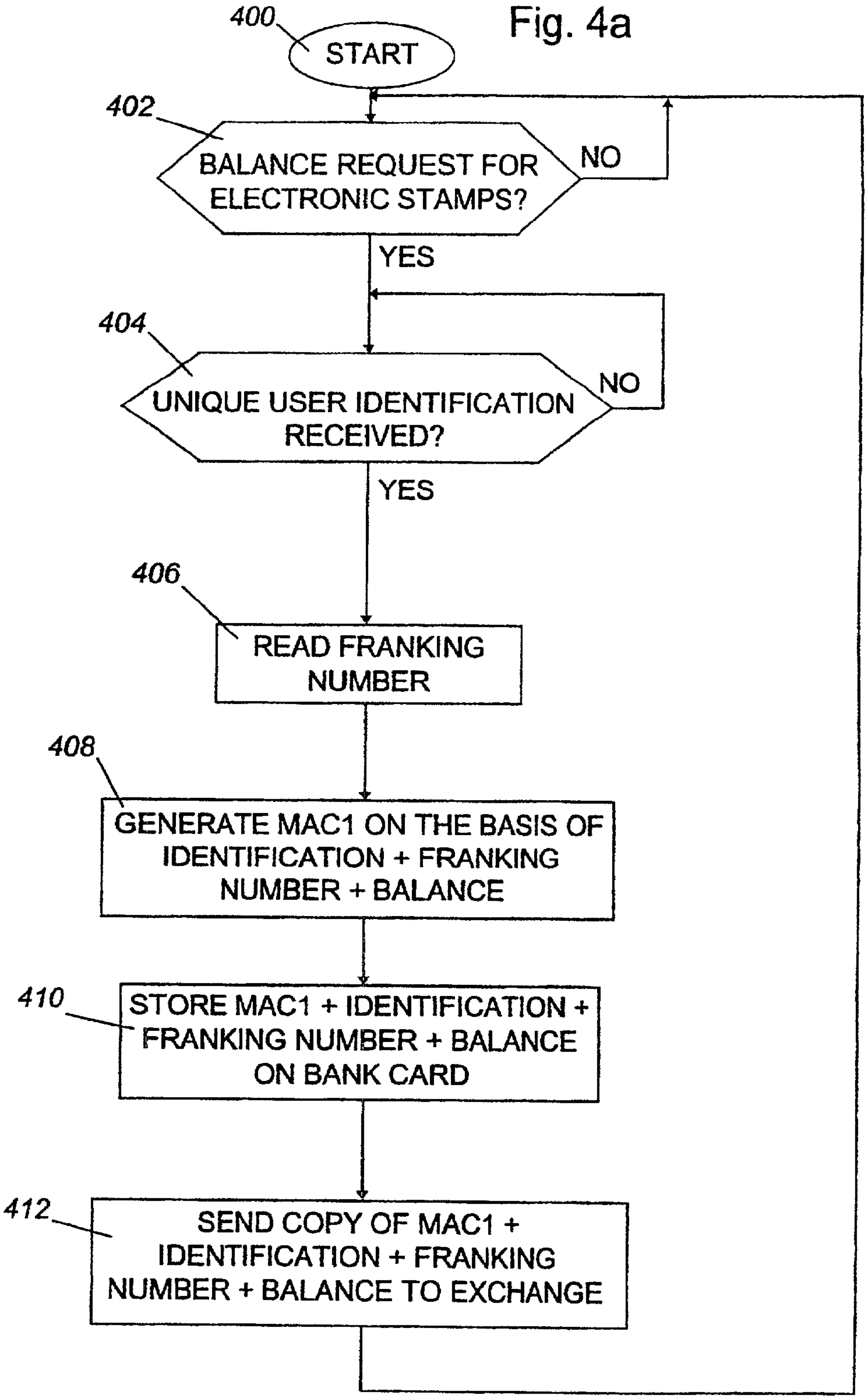
FIGS. 4*a* and 4*b* show the steps of a method according to the invention in which use is made of a personal computer.
Figure 4B:
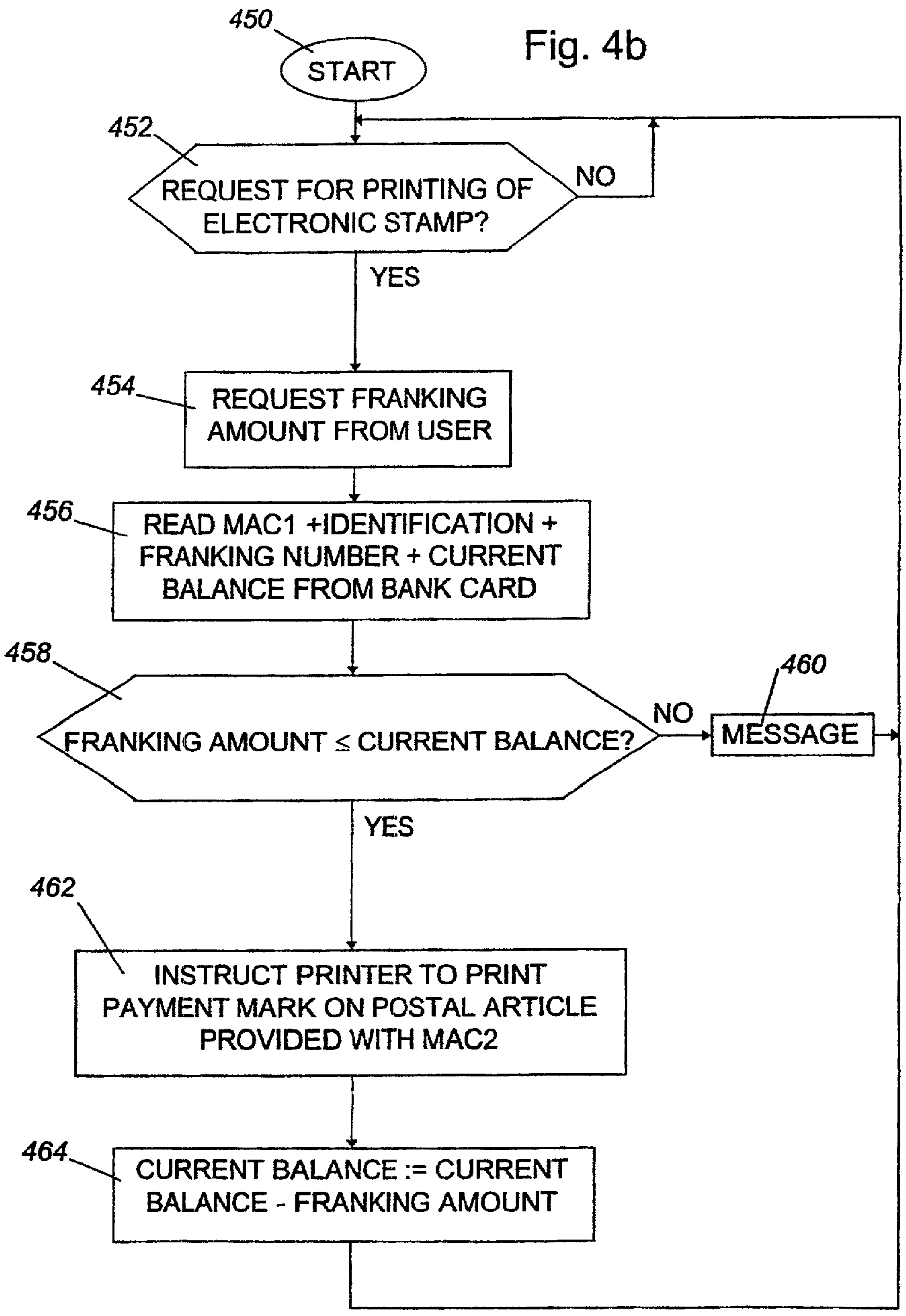

FIG. 4*a* shows a flowchart of an embodiment of the functioning of the PC 50 in the context of the present invention for reloading a bank card 18 with a certain desired amount to be spent on electronic stamps. FIG. 4*b* relates to the actual printing of such an electronic stamp with such a bank card 18.

In step 402, the microprocessor 52 waits until a user submits a request for providing an amount for one or more electronic postage stamps. For executing such a request, the user makes use of the known input means, such as keyboard 58 and/or mouse 60. In this regard, the user first inserts his bank card 18 in the input/output unit 14.

The microprocessor 52, via the monitor 54, thereafter asks the user to identify himself in a unique manner, step 404. This can be done, for example, by the user inserting his bank card 18 in the input/output means 14, so that the microprocessor 52 can read the number of said bank card 18. Subsequently the user shall have to identify himself, for example with the aid of a PIN code, in order to make clear that he is the legitimate user of said bank card 18. The checking of the PIN code preferably takes place, as known in the prior art, on the bank card 18 itself. Said microprocessor 52 can subsequently assume that the user has been identified in a unique manner with the aid of the bank card number, for example. This takes place in step 404. Alternatively, the microprocessor 52 can ask the user to enter the combination of bank card number and PIN, or another unique combination, via keyboard 58, after which this data is checked locally by the PC 50. In that case, said PC 50 must have this combination of data securely stored.

In step 406, the microprocessor requests a unique franking number at the exchange 34. This occurs in a same way as explained above with reference to the FIGS. 2*a* and 2*b*.

Subsequently the SAM 74 of the server system 70, together with the bank card 18, generates a MAC, MAC1 on the basis of the identification code of the user, the related franking number and the balance that was made available for electronic stamps. Alternatively, said server system 70 calculates an encoding of the identification code, the franking number and said balance. This takes place in step 408.

In step 410, the microprocessor stores, at choice, MAC1, the identification code, the franking number and said balance on the bank card 18. If an encoding step has taken place instead of a MAC calculation, the encodings of the identification code, the franking number and the said balance are stored on the bank card.

In step 412, the server system 70 sends a copy of either MAC1, the identification code, the franking number and the balance, or the encodings of the identification code, the franking number and the balance, to the exchange 34. Said exchange 34 will again store said data in its memory 40.

After step 412, the storage of a balance on the bank card 18 that can be used for electronic stamps is completed.

FIG. 4*b* shows how a user, with his bank card 18 which has thus been provided with a balance, can instruct the PC 50 to print a franking mark on a postal article.

After the related program is started, step 450, said PC 50 waits until the user has submitted a request for printing a franking mark, step 452.

Via step 454, said PC 50 experiences how high the postage costs must be that are to be processed in the franking mark. The user can enter the postage costs, for example, via the keyboard 58. It is imaginable that this step is automated with the aid of an automatic weighing device (not shown), connected to said PC 50, which weighs the postal article, after which the postage costs are automatically determined and passed on to said PC 50.

The user has brought his bank card 18 into contact again with the input/output means 14 and has identified himself again with the aid of his PIN code. The microprocessor 52 reads MAC1, the identification code, the franking number and the actual balance of the bank card 18, step 456.

The microprocessor 52 subsequently checks, step 458, whether the actual balance is sufficient for the desired postage costs. If not, a message to the user then follows in step 460, entailing, for example, that the user must restore his balance on the bank card.

In step 462, the microprocessor 52 instructs the printer 62 to print a franking mark, calculated by the SAM 64, on the postal article 22 after the user has inserted the postal article 22 in the printer 62. In that regard, SAM 64, together with the bank card 18, calculates MAC2 on the basis of all data which are included in the franking mark, among which: the identification code, the unique franking number, the actual balance and the postage costs. As an alternative for calculating a second MAC, MAC2, said data can be encoded. The data preferably also contains a PC-code which uniquely identifies said PC 50.

After step 462, the actual balance is decremented in step 464 by subtracting the postage costs therefrom. The new actual balance then represents the amount that is still available for further electronic stamps.

It is remarked that in the embodiment which is described on the basis of FIGS. 4*a*, 4*b* and 5, a unique franking number is used just until the original balance is expended. However, since the actual balance and the actual postage costs are also included in each franking mark, there is still mention of a unique bit string per postal article.

After step 464, the program returns to step 450.

The payment by the customer preferably takes place at the moment the customer restores the balance on his bank card. This can take place electronically in a manner known per se. In that regard, the debiting can again take place, via the exchange 34, from a central bank balance, or directly from the bank card 18 if this comprises an electronic purse.

It is also imaginable, however, to let payment be made later, as explained above with reference to the embodiment of FIG. 1. In that regard, the balance loaded in the bank card 18 does not represent a total amount which can be expended on electronic stamps, but the number of times that the franking number provided can be used. The advantage of post-payment is that the user does not need to weigh his postal article 22 in advance in order to have the correct franking value included in the franking mark 28. After all, the franking mark here too uniquely identifies the user, who can subsequently have the invoice sent to him or whose bank balance can be automatically debited. Moreover, the presence of the unique franking number with identification code and the current "balance" guarantees that each postal article 22 is uniquely identified, so that fraud can be detected immediately.

It is further remarked that, instead of or together with an identification of the user, it is possible to include an identification of the SAM 64 in the franking mark. In that case, the owner of the PC 50 with SAM 64 is responsible for the correct payment of the electronic postage stamps and for possible fraud carried out with the PC 50. It is then up to said owner to subject access to the program for purchasing an electronic postage stamp to authorisation rules.

In a further embodiment with the aid of a PC 50, a standard PC without SAM 64 can be used. In this case, said PC 50 cannot safely calculate MACs. The franking mark is then produced either centrally in the exchange 34 or in server system 70, and sent to said PC 50. Said PC 50 then combines the received franking mark with possible other information and prints this on the postal article 22 with the aid of printer 62. In that case, instead of working with the storage of a balance for electronic stamps on bank card 18, one franking mark per time is retrieved from the exchange 34. In this case, payments of electronic postage stamps preferably take place directly either by debiting a user's bank balance, or from bank card 18 with an electronic purse. To contend with possible fraud, the user must uniquely identify himself, for example with his ATM/bank number and an associated PIN. Preferably, identification then still takes place with bank card 18 and by checking a PIN code.

In the above it was described how a franking mark with a unique bit string can be generated and printed on a document. Claims targeted to this process were submitted on 20 Nov. 1998 with the Netherlands patent application 1010616, of which the priority is claimed. Below, the processing will be further discussed of documents provided with such a franking mark, and particularly on the checking of the validity thereof. As an example in that regard, the situation that the documents concern postal articles will be discussed. As mentioned before, the documents are not required to be postal articles.

First, a short description will be given of the "BriefPost 2000" (LetterMail 2000) system, which was developed by the Netherlands PTT Post. This is followed by a description of how the franking mark can be checked in the sorting process.

BriefPost 2000.

Figure 6:
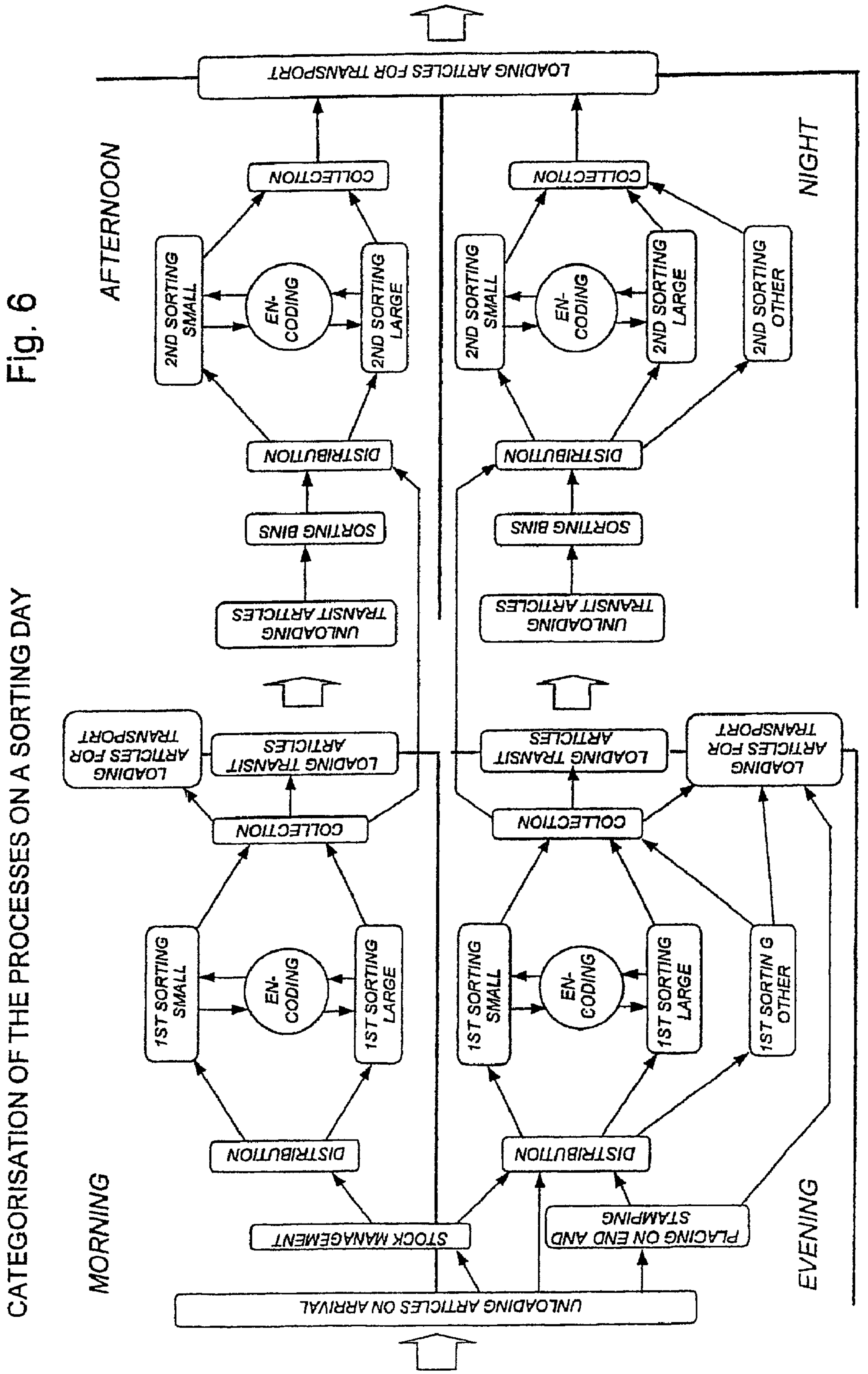
FIG. 6 diagrammatically shows a sorting process for postal articles.

Automatic sorting within BriefPost 2000 is diagrammatically explained in FIG. 6 and divisible in two production processes for the sorting of "Briefpost Klein" (LetterMail Small) and "Briefpost Groot" (LetterMail Large), related to small and large postal articles respectively.

These two categories are sorted by different machines. In principle, however, both categories comprise the same but separately implemented sorting passes:

1. first sorting pass: this sorts the mail for the sorting centres;
2. second sorting pass: this sorts the mail for delivery to the mail address or for delivery in a post-office-box.

In the first sorting pass, dependent upon the information in the address image of the mail, the encoding computer network determines the sorting information. In principle, the system has 30 sec. available for this—during said time the postal article is physically present in the sorting machine (does not apply to the sorting machine for "Briefpost Groot"). The sorting information is subsequently placed on the mail in the form of indexes:

1. sorting index (SIX): this index is placed for "Briefpost Klein" upon successful "encoding"; in the first sorting pass, the sorting information is established herewith, for example as a bar code on the mail. In the second sorting pass, this can subsequently be read reliably;
2. identification index (IX): this is placed for "Briefpost Groot", or if the encoding for "Briefpost Klein" was not available on time. A sorting index (SIX) is not printed, but a sequence number (IX) is placed. Any sorting information is then stored in the computer network, related to this number. For the sorting machine for "Briefpost Groot", this is done for all postal articles in connection with too short a mechanical delay line; for the sorting machine for "Briefpost Klein", this method is used only if the sorting information is not available on time (within 30 sec.). In the second sorting pass, the sorting information is looked up on the basis of the identification index. For "Briefpost Klein", an identification index can also be used if the encoding computer cannot determine the sorting information within a certain time. The mail must then pass through the first sorting pass again later;
3. customer index (KIX): this index contains, for example, the postal code and the house number, post office box number or prepaid reply number, for example in the form of a bar code. This is an index which can be registered by customers on the mail as a part of the address;
4. special customer index: this is an internal index used by the Netherlands PTT Post which is attached on postal articles via stickers. Said index is used, for example, for relocation service.

For the first sorting pass "Briefpost Klein", the encoding process distinguishes between online and offline encoding:

1. online encoding: this is the process whereby the sorting information of the mail is established within a certain time (30 sec.);
2. offline encoding: this is the process whereby, if the online encoding was not successful because of a time excess, the mail is provided with an identification index (IX) and subsequently, from the associated stored address images, the sorting information is as yet established, which, after a second pass of the first sorting pass is as yet placed on the mail.

Figure 7:
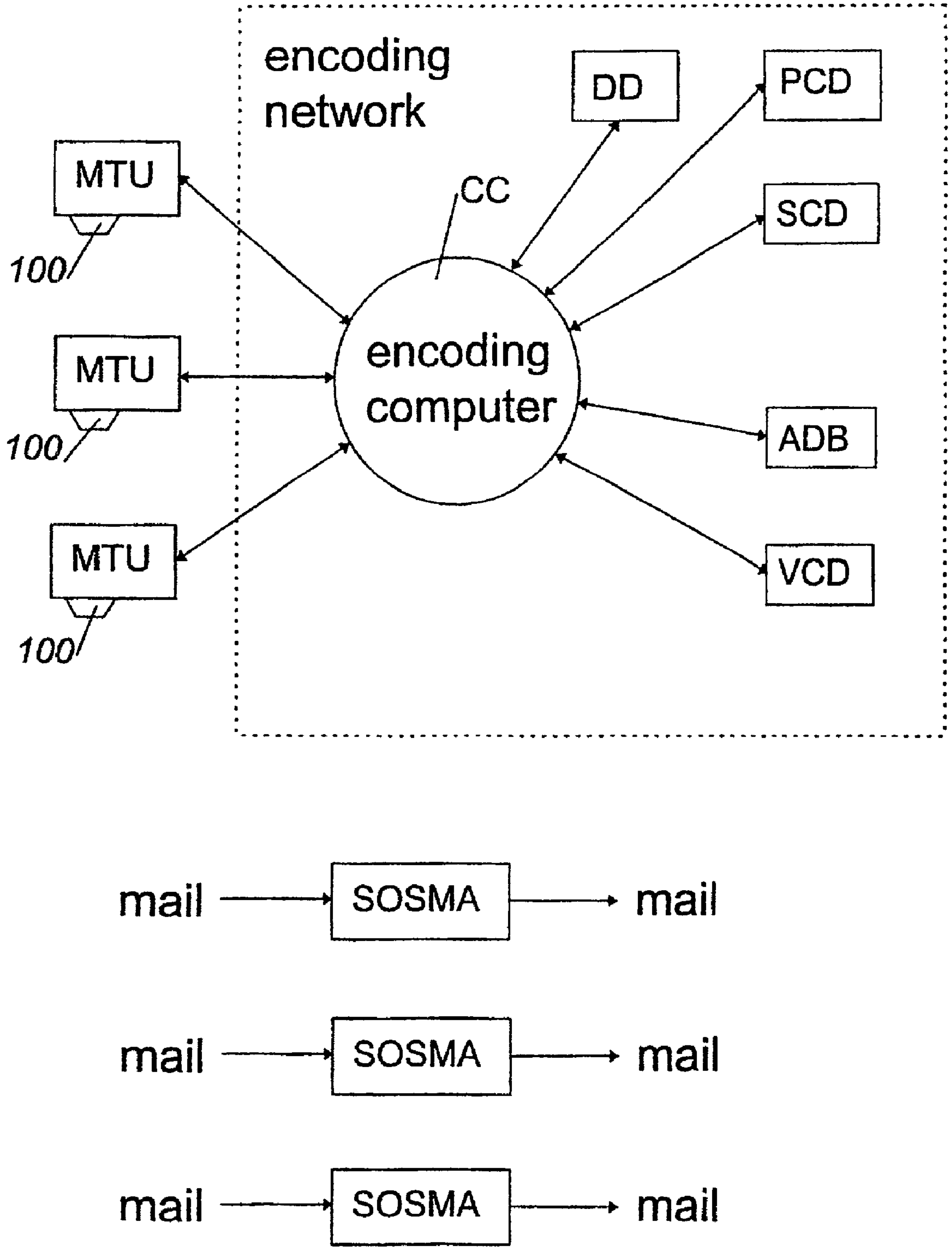
FIG. 7 shows some elements for checking a franking mark.

FIG. 7 shows an example of an encoding network which can be used in regard to the present invention. The encoding network consists of an encoding computer CC and various encoding means:

1. encoding computer CC (Coding Computer): this distributes the encoding operations over the encoding means and determines the encoding strategy to be carried out per postal article;
2. first address reader PCD (Primary Coding Device): this determines the sorting information for the bulk of all mail;
3. second address reader SCD (Secondary Coding Device): this attempts to determine the sorting information for mail which was not encoded by the first address reader;
4. address retrieval system ADB (Address Database): this attempts as yet, in the case of unreliable results of the first address reader PCD and of second address reader SCD, to determine reliable sorting information;
5. video encoding station VCD (Video Coding Device): here the sorting information can be determined manually for the remaining mail;
6. decoding unit DD (Decoding Device), which is arranged for decoding the franking marks 28 of read-out postal articles.

It is remarked that further or alternative encoding means are possible in the future.

The encoding network is connected to the sorting machines. An important part of the sorting machine is formed by one or more Mail Transport Units MTU. Each MTU is arranged to read and print indexes. Each MTU is also provided with a camera 100 for making mail images which serve as input for the encoding computer.

Before the mail is processed by one of the MTUs, it is segregated (i.e. categorised in "Briefpost Kein" and "Briefpost Groot"), put up in bins (i.e. each postal article has a uniform position of address side and franking designation; for this, use is preferably made of marking sign 26 on the postal article) and stamped (i.e. devaluation of postage stamps or printed franking value). This is preferably done with the aid of a "Schift-, Opzet-, en Stempelmachine" SOSMA (Segregate, place-on-end and stamping machine). The SOSMA has the task of separating certain bulk streams from the rest (for example giro order envelopes etc.). For this, the FIM code is applied.

Bar Code Reader.

There are several options for the manner in which the bar code 28 can be read in the process.

For example, use can be made of the images which are made by the cameras 100 in the sorting machines as input for the encoding process; from said images, via a special encoding unit connected to the cameras 100, the contents of the bar codes are retrospectively determined. This causes a considerable increase of the data streams in the encoding network, since 100% of all images must be sent additionally to such an encoding unit.

Another possibility is the application of a dedicated bar code reader which, for example, supplies an ASCII string as output data, which subsequently, via the encoding network, can be further transported to a verification database system. At choice, such a bar code reader can be built into the sorting machine for, example, but also into the SOSMA. In this case, the impact on the sorting process is minimal, and the bar codes 28 of almost all mail streams to be handled manually can be checked herewith.

Sometimes the delivery address, or at least the postal code thereof, will be included in the franking mark. Therefore, at the moment the franking mark is read, at least an essential part of the delivery address also becomes available. This information can firstly be used to speed up the reading out of the printed delivery address 30 with an Optical Character Recognition (OCR) unit, and secondly to establish directly whether irregularities with the delivery address (and thus perhaps with the use of the unique bit string) have taken place.

Unique Bit Strings and Franking Mark.

As described before, the presence of a unique bit string in the franking mark 28 can be used as a means for indicating the validity of a franking (or of an arbitrary document). The point of departure of the method is the use of a new unique bit string for each transaction. Thus a unique bit string is, in that case, only valid once. As mentioned, restrictions in the storage capacity of, inter alia, smart cards can lead to this point of department not being realisable at the current (affordable) state of the art (a smart card with which only a few, for example less than 10, transactions are possible is hardly of practical use). A solution for this has been found in the application of a "purse" or counter on the smart card in combination with a unique bit string. Such a unique bit string is then valid for several times, for example in combination with a balance which is accurately defined beforehand.

Checks.

Figure 8:
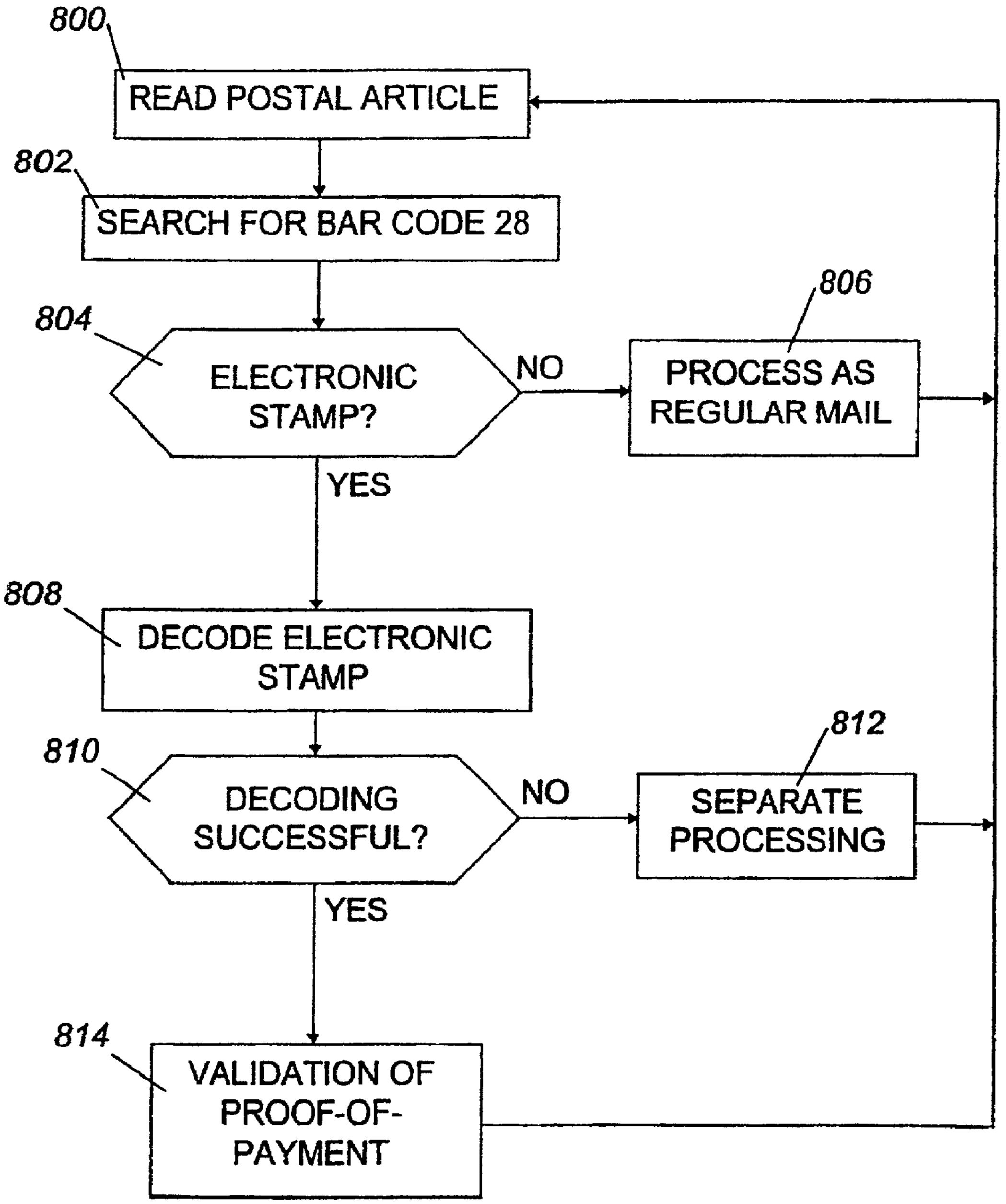
FIGS. 8 up to and including 14 show flowcharts which further illustrate the checking process.

The checks are restricted to those which are possible in the sorting process. FIGS. 8 up to and including 14 show flowcharts for clarifying the checks.

Scanning the Franking Mark (FIG. 8).

The postal article 22 (letter) is read in by the MTU with the camera 100 for establishing the address data, step 800. In doing so, a full image of the front of the postal article is made.

In this image, the (two-dimensional) bar code 28 is searched for, step 802. It is subsequently analysed whether the bar code 28 contains an electronic stamp in the sense of the invention, step 804. If this is not the case, the postal article is processed as regular mail, step 806.

If an electronic stamp is present, the bar code 28 is interpreted/decoded, so that the information becomes available, step 808 (see next section). For this, a special decoding unit DD (Decoding Device) could be integrated in the encoding network (FIG. 7), besides the PCD and the SCD.

Figure 9:
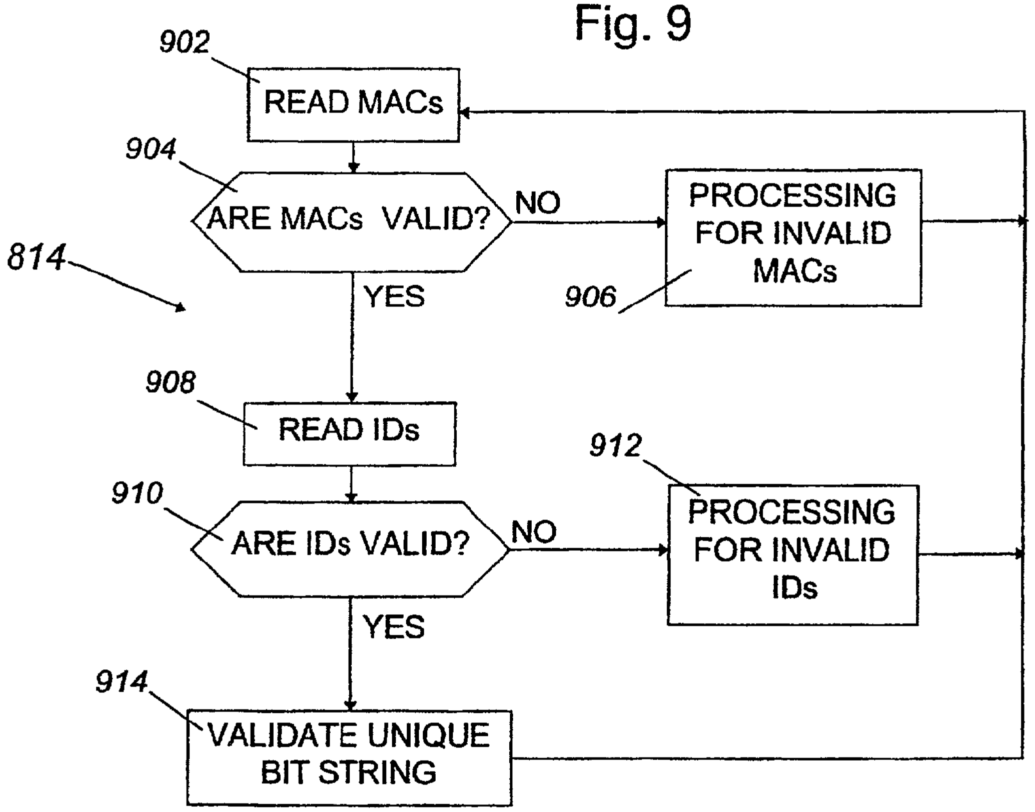

If for one reason or another the franking mark cannot be decoded correctly, step 810, the postal article is lead to a separate process, step 812. Subsequently, the Proof-of-Payment field is validated, step 814. Step 814 is detailed further in FIG. 9.

Decoding of Franking Mark (Step 808).

The franking mark 28 contains, for example, a 2D DataMatrix bar code. This contains different information units, among which a digital signature of the sender (franking person), enciphered (encrypted) information, and non-enciphered data (elements). The enciphered information itself is built up of data elements. For the digital signature and the enciphering, public key cryptography is used, the digital signature being generated with the aid of the private key of the sender and the enciphering taking place with the (applicable) public key of PTT Post.

A first check takes place on the basis of the digital signature. For the check on the payment, the proof-of-payment is validated (step 814).

Validating Proof-of-Payment (step 814).

The Proof-of-Payment contains a number of data elements and checking elements. The checking elements are (for example) MACs which protect the data elements (protection can also take place via encoding or encryption). The data elements are the franking mark and the identifications of the payment means (for example smart card 16/18), the issuing machine 2, 50 and the franking machine 20 (or printer 62, if desired), and the payment. See FIG. 9, in which the following steps of the validation process for the use of MACs are shown (for the use of encoding or encryption, the diagram is analogous):

1. Read MACs, step 902, and check whether the read-in MACs are valid, step 904. If this is not the case, the franking is not valid and a separate process, step 906, is executed.

2. If the MACs are valid, read the identifications of the issuing machine 2, 50 and franking machine 22 (printer 62), step 908, and check their validity, steps 908–912.

3. Read the identification of the payment means and check whether this is a plausible one. This can also be carried out in the steps 908–912 and is not a rigid check.

4. Finally the validity of the payment must be verified by checking whether a valid (new, but issued) franking mark is printed on the postal article 22, step 914. This concerns a simple look-up in the with unique bit strings database in the second memory 40 plus marking the related unique bit string as having been printed. If the method of "unique bit string plus counter", in which the counter defines either a number of times that the bit string may be used or a balance, is used, the following applies: the combination of unique bit string and counter must be checked. As remarked before, the combination of bit string, although used more often than once, and counter is always still unique for each franking. Firstly, with the aid of the database 40 the validity of the unique bit string can be determined. After all, this must have been issued. If the bit string has received a certain period of validity, this can also be checked. Dependent upon the manner of payment (before providing the unique bit string or after processing of a related postal article by the post office), it must be registered what has been provided and/or printed. In the case of unique bit strings not having been provided, already having been printed before, and/or no longer being valid, the franking is not valid.

If there is mention of a unique bit string, to which a certain balance is related, the combination of said bit string and said balance (counter value) shall have to be present in memory 40. Specifically it must become apparent that such a combination was not printed on a postal article before. Subsequently, this combination must be designated as having been printed and no longer being valid.

In the database 40, the following data can be stored for each unique bit string:

1. the date of issue and period of validity,
2. the manner of payment allowed (before the provision thereof or after printing on a postal article) and
3. combinations of the bit string with balance (counter values) printed on postal articles. Note: it is also possible to maintain only a current counter value centrally and, upon detection of a bit string with a certain counter value, to modify this centrally registered counter value. This will be explained hereinafter.

Figure 10:
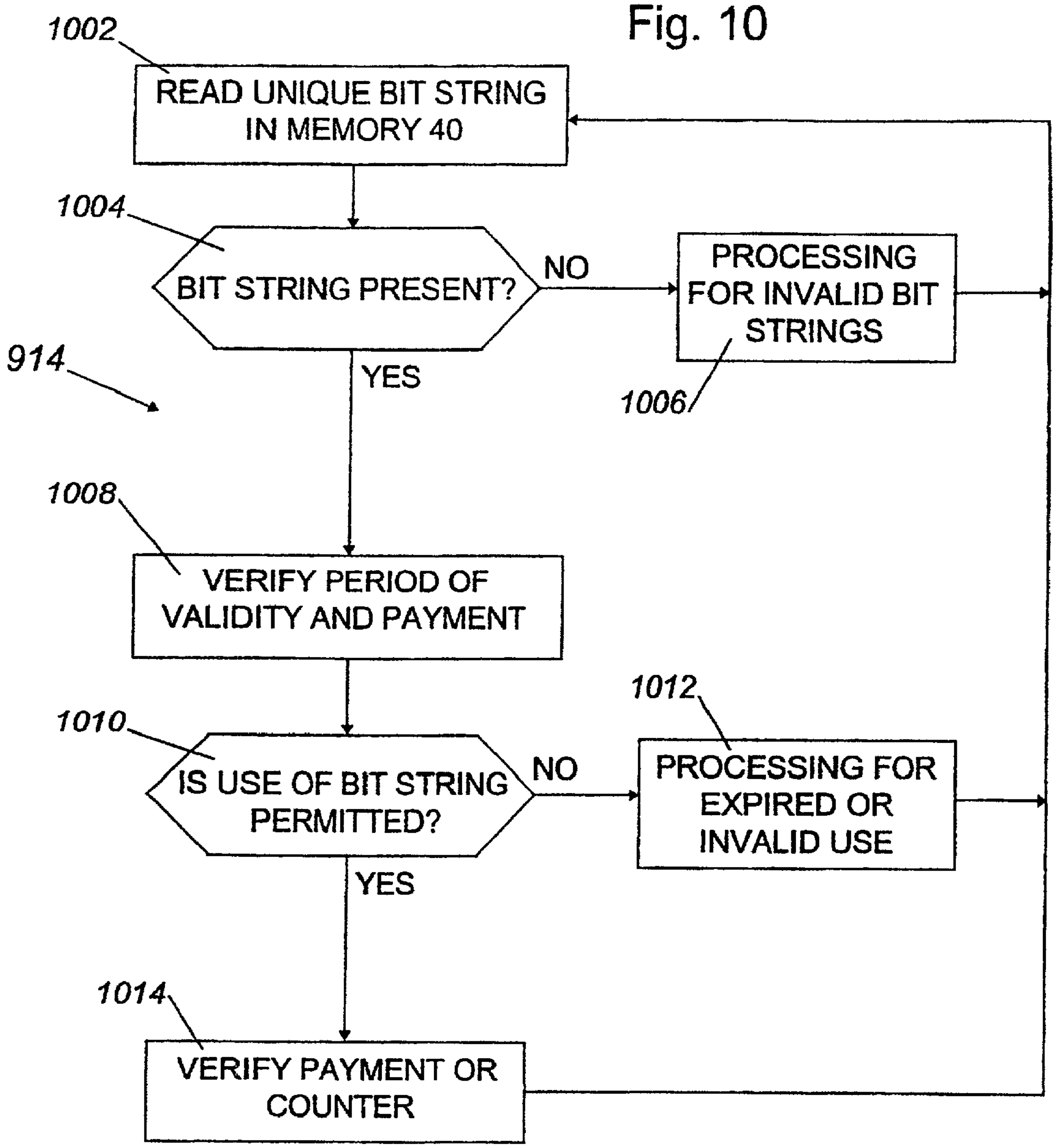

Processing and checking on the basis hereof is explained on the basis of steps 1002–1014 in the flowchart of FIG. 10, which speaks for itself.

Dependent upon the manner of payment, pre-paid or post-paid, the use is registered differently. More simple and more fundamental implementations of the checks are also possible, as will be explained hereinafter.

Payment in Advance (Pre-Payment).

In principle, a certain set of unique bit strings is present on the card 18, which bit strings are marked as such in the database 40 when the card 18 is sold. The unique bit strings can each represent a certain (fixed) value or each be used in combination with a counter (balance). In each case it holds that: after use of the counter(s), the unique bit strings are invalid.

For the pre-paid bit strings, the initial balance is registered (per unique bit string or totally per card 18, i.e., per set of unique bit strings). For each franking, a part of this balance is then subtracted. When the balance is used up, the bit string is used up.

The checking process is the same as that for the "normal" loadable cards.

Figure 11:
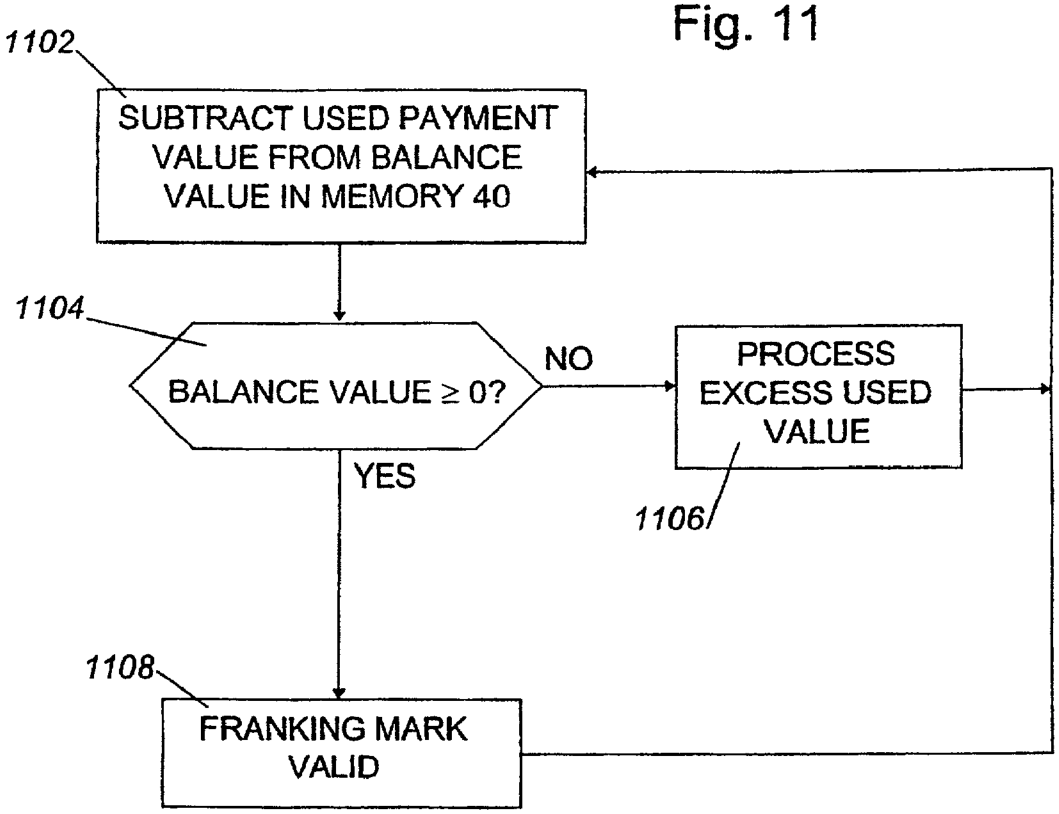
Figure 12:
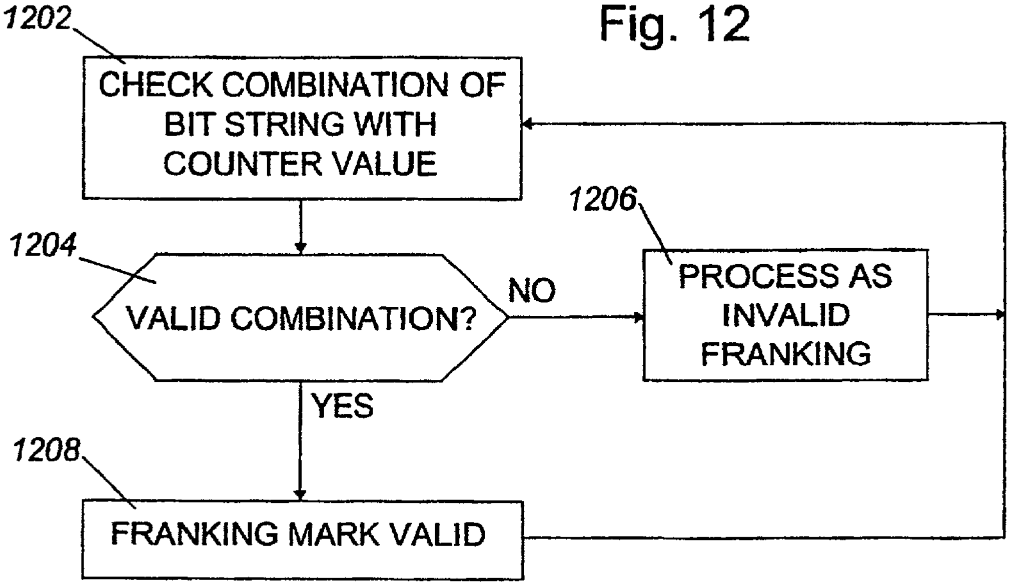

In first instance, the simple method, FIG. 11, can be implemented, until there is sufficient reason to implement the more fundamental one, FIG. 12.

Simple.

In the most simple case, such as explained on the basis of steps 1102–1108 in FIG. 11, only a total value is maintained. Hereby it is not possible, for example, to detect copies until the counter value registered in the centrally (memory 40) registered counter value has become zero. There is indeed the guarantee that ultimately the misuse will be discovered and that the total misuse cannot be more than the initial balance.

Fundamental.

If all frankings are registered, i.e. for the unique bit strings it is registered which counter values are indeed printed on a postal article, then copies can be detected. The individual counter values must reflect that the initial counter value has been used up consecutively. This is further explained on the basis of steps 1202–1208 in the flowchart of FIG. 12.

The initial counter value can be considered as an interval. Each counter value is a sub-interval thereof. Now the intersection of each pair of sub-intervals must be empty, and the union of all sub-intervals must cover the initial counter value. The latter does not need to occur as a whole, for example because certain franked postal articles were never offered for delivery, or because a part of the balance is not yet used.

Retrospective Payment (Post-Payment).

Here also two methods apply. In principle, a unique bit string is "used up" for each transaction.

For technical implementation reasons, a choice can be made between the use of a unique bit string for a series of transactions to be defined. Besides the "using up" of the bit string, a counter is applied here for the franking which, just as in conventional franking machines, registers the use that is to be charged.

A limit can be imposed upon the balance that can be used (in time or in money). Upon exceeding this, reloading of the card 18 is required.

For post-payment, for example, a counter is incremented by one, or by the franked value, for each franking. This is possible until a certain limit is reached, after which the previously mentioned reloading of the card is required. At the moment of reloading, the card holder can be "discharged" for the use up to that moment, provided, of course, that payment of the franked object can be guaranteed.

An implementation variant consists of actually decrementing the counter from a maximum value, which can be simply set upon purchase. As soon as the counter reaches 0, the bit string becomes invalid. For unlimited use, the limit can then be set to an extremely large value which is sufficient for practical purposes.

Simple.

Figure 13:
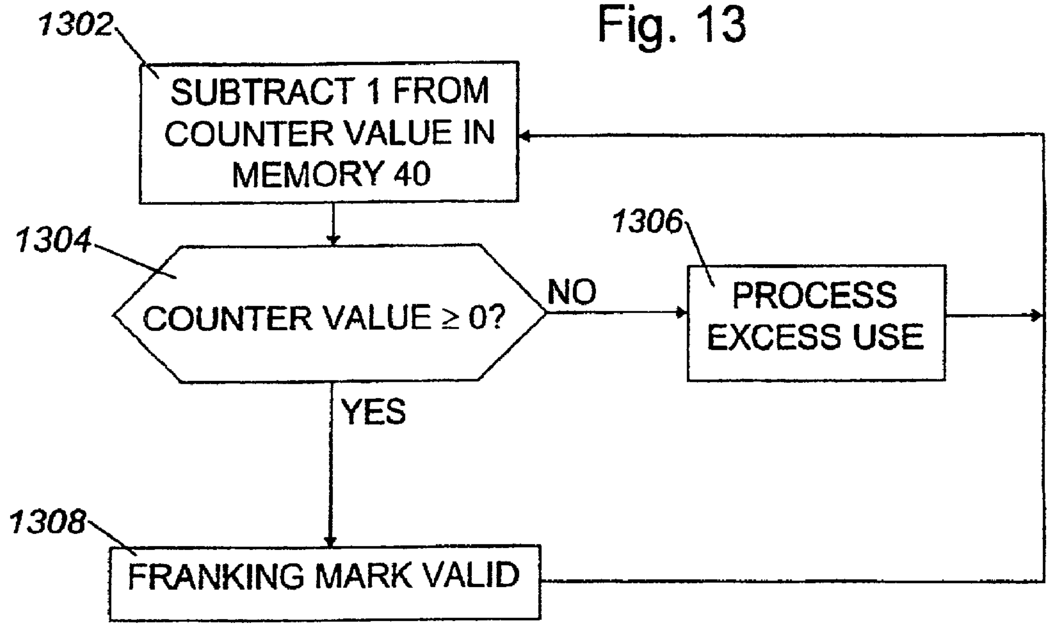

If the checking of duplicates is not taken into consideration, then, in first instance, it will suffice to maintain the number of frankings: see steps 1302–1308 in FIG. 13. The option of used balance is not indicated in the figure, but works analogously.

Fundamental.

Figure 14:
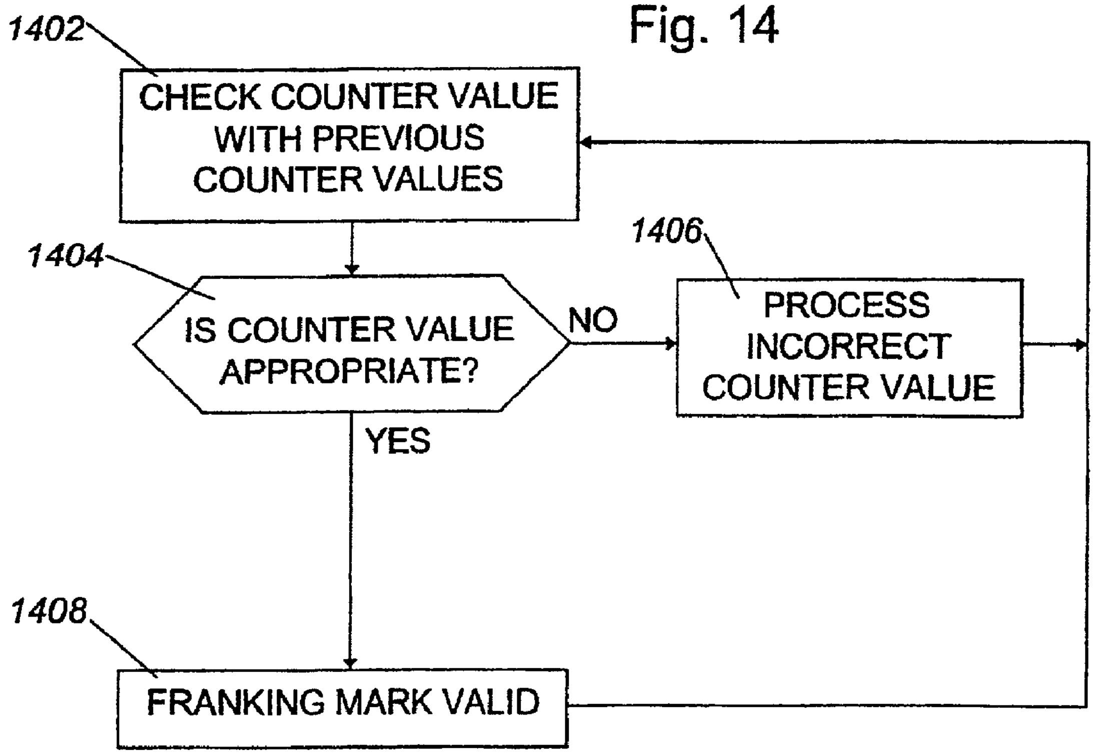

For checking duplicates, all individual counter values for the unique bit string must be maintained. In principle, a bit map, for example, is the appropriate means to this end. This is further explained on the basis of steps 1402–1408 in FIG. 14. Because the counter values are, in principle, consecutive, and postal articles once franked must be offered within a limited period, the actual size of the bitmap can be restricted by maintaining which counter value was the last before the commencement of the related period. This state and the bitmap are modified daily. Here too the option of employing a used balance is not included in the figure.

Hybrid.

In first instance, the hybrid method is identical to pre-payment. The checking and thereto related registration of the use is therefore identical.

Only after the possibility of post-payment is activated, will the thereto related checking and registration come into consideration. Since in general only a limited number of frankings will be relevant here, a bitmap to measure can be used.

In first instance, the pre-payment will be used up, after which the counter will be used. As soon as the counter is at 0 (or has reached its maximum limit), the unique bit string is used up.

Other Aspects: Optimal Use of Computer Resources and CPU Time.

As mentioned, a postal article is held within the sorting machine for a certain maximum period of time (30 seconds) in "Briefpost Klein", during the first sorting pass of Brief-Post 2000, in order to obtain the sorting information (postal code). If present, the postal code can be derived from the franking mark 28 quickly and reliably (during said 30 seconds).

In the Netherlands the situation is such that, after the first sorting pass, the postal articles are brought to the sorting centre of the destination, where a second sorting pass takes place, see also FIG. 6. There is time, in particular computer time, between the first and second sorting pass, which is longer in proportion to the delay between the first and second sorting pass (sometimes the second sorting pass takes place in an other centre). This time may be used as computer time to carry out the necessary checks.

The unique bit strings detected in the first sorting pass (possibly with counter value) can be placed on a physical data carrier (CDROM) for subsequent physical distribution, together with the postal articles. Transfer of said data can, of course, also take place by network connection.

During the second sorting pass an almost complete check can take place, since then the original (central) database is available, together with all unique bit strings detected on that day (+counter values). In this way, the problems of geographical separation of sorting centres is dealt with.

Prior to being transported to a checking location, the unique bit strings read during the first sorting pass can be arranged in a sequence which is as advantageous as possible for the check, so that during the actual check the least possible amount of time will be needed. Such an advantageous sequence can be (alpha) numerical, for example.

The check can physically take place in the exchange 34. Instead of that, however, the check can also take place in a number of geographically separated locations, for example at the locations where the second sorting pass takes place. This makes it more difficult to maintain one central database in exchange 34, because this requires the transport of issued unique bit strings to the separated checking centres via a data carrier or via an adequate network connection between the checking centres and the exchange 34. Note that (illegal) duplicates of franking marks on postal articles offered to different sorting centres can be identified in the second sorting pass.

In the event that the delivery address is included in the franking mark in a protected manner, it is no longer possible to copy the franking mark in a simple manner to send mail to different delivery addresses (receivers).

Furthermore, it will be clear to the expert that, although all processors and SAMs described up to here have been shown as single blocks, they may be implemented in practice in any other known way, i.e., as, for example, several cooperating subprocessors which, at choice, are placed at some distance from each other and provide the desired functionality. They are preferably controlled by software but, where necessary, they may comprise analogue and digital circuits.

The invention claimed is:

1. A method of producing and checking franking marks, comprising the steps of:

storing a set of unique bit strings in a first memory in a central office that is connected to a plurality of terminals;

making one or more of the unique bit strings available to at least one terminal of the plurality of terminals;

at the central office, receiving from the one terminal a copy of the unique bit string made available thereto in combination with an identification code and storing in a second memory at the central office the copy of the unique bit string in combination with the identification code received from the one terminal;

reading of a franking mark after the franking mark has been printed on a document, the franking mark including an encoded identification code and an encoded unique bit string;

decoding the franking mark to render a decoded identification code and a decoded unique bit string;

checking whether the decoded identification code is correct by comparing the decoded identification code to the identification code stored in the second memory; and checking whether the decoded unique bit string is valid by comparing the decoded unique bit string to the unique bit string stored in the second memory.

2. The method according to claim 1, in which the franking mark further comprises a terminal identification code associated with the one terminal.

3. The method according to claim 1, in which the identification code comprises at least one of a user identification code and a printing identification code, said printing identification code being associated with a printing device which printed the franking mark.

4. The method according to claim 1, in which the franking mark comprises a combination of the unique bit string and a counter value, and the method also comprises the steps of subtracting the counter value from a remaining counter value stored with the unique bit string in the second memory and checking whether the remaining counter value amounts to more than zero, and, if so, then establishing that the franking mark is valid, and, if not, then establishing that the franking mark is invalid.

5. The method according to claim 4, in which also is checked whether a period of validity associated with the franking mark has expired.

6. The method according to claim 4, in which, if it is established that the franking mark is valid, a routine is started for automatic post-payment of an account related to the franking mark.

7. The method according to claim 1, in which the franking mark comprises a combination of the unique bit string and a counter value and the method also comprises the step of checking whether the combination occurs in the second memory, and, if so, then establishing that the franking mark is valid, and, if not, then establishing that the franking mark is invalid.

8. The method according to claim 1, in which the franking mark is located on a postal article which, for the sake of delivery is sorted in at least a first and thereafter a second sorting center, and in which the reading and decoding steps are executed in the first sorting center and the information obtained therefrom is sent to a checking center, after which the two checking steps are executed in the checking center prior to sorting in the second sorting center.

9. The method of claim 1, wherein the unique bit string in combination with the identification code are protected by a Message Authentication Code and the method includes the step of checking the Message Authentication Code.

10. The method of claim 1, wherein the unique bit string in combination with the identification code are protected by encoding and the method includes the step of checking the encoding.

11. A system for producing and checking franking marks, comprising:

means for storing a set of unique bit strings in a first memory in a central office that is connected to a plurality of terminals;

means for making one or more of the unique bit strings available to at least one terminal of the plurality of terminals;

at said central office, means for receiving from said one terminal a copy of the unique bit string made available thereto in combination with an identification code and storing in a second memory at said central office the copy of the unique bit string in combination with the identification code received from said one terminal;

means for reading of a franking mark after the franking mark has been printed on a document, the franking mark including an encoded identification code and an encoded unique bit string;

means for decoding the franking mark to render a decoded identification code and a decoded unique bit string;

means for checking whether the decoded identification code is correct by comparing the decoded identification code to the identification code stored in the second memory; and means for checking whether the decoded unique bit string is valid by comparing the decoded unique bit string to the unique bit string stored in the second memory.

12. The system according to claim 11, in which the franking mark further comprises a terminal identification code associated with the one terminal.

13. The system according to claim 11, in which the identification code comprises at least one of a user identification code and a printing identification code, said printing identification code being associated with a printing device which printed the franking mark.

14. The system according to claim 11, in which the franking mark comprises a combination of the unique bit string and a counter value, and the system also comprises means for subtracting from the counter value a remaining counter value stored with said unique bit string in said second memory, and checking whether the remaining counter value amounts to more than zero, and, if so, then establishing that the franking mark is valid, and, if not, then establishing that the franking mark is invalid.

15. The system according to claim 14, which, if it is established that the franking mark is valid, starts a routine for the automatic post-payment of an account associated with the franking mark.

16. The system according to claim 11, in which the franking mark comprises a combination of the unique bit string and a counter value and the system also comprises means for checking whether said combination occurs in said second memory, and, if so, then establishing that the franking mark is valid, and, if not, then establishing that the franking mark is invalid.

17. The system according to claim 11, also comprising means for checking whether a period of validity associated with the franking mark has expired.

18. The system according to claim 11, in which the franking mark is located on a postal article which, for the sake of delivery is sorted in at least a first and thereafter a second sorting center, and in which the system in the first sorting center comprises said means for reading and said means for decoding and means for sending the information obtained therefrom to a checking center, and said checking center comprises both said means for checking prior to sorting in the second sorting center.

19. The system of claim 11, wherein the unique bit string in combination with the identification code are protected by a Message Authentication Code and the system includes means for checking the Message Authentication Code.

20. The system of claim 11, wherein the unique bit string in combination with the identification code are protected by encoding and the system includes means for checking the encoding.

* * * * *